(12) United States Patent
Yoshida et al.

(10) Patent No.: US 9,568,380 B2
(45) Date of Patent: Feb. 14, 2017

(54) TORQUE SENSOR AND MANUFACTURING METHOD THEREFOR

(71) Applicants: DENSO CORPORATION, Kariya, Aichi-pref. (JP); NIPPON SOKEN, INC., Nishio, Aichi-pref. (JP)

(72) Inventors: Shuntaro Yoshida, Kariya (JP); Takao Iwaki, Miyoshi (JP); Inao Toyoda, Anjo (JP); Takuya Ishikawa, Nishio (JP); Akira Okada, Okazaki (JP); Kazumasa Ogino, Nishio (JP)

(73) Assignees: DENSO CORPORATION, Kariya (JP); NIPPON SOKEN, INC., Nishio (JP)

( * ) Notice: Subject to any disclaimer, the term of this patent is extended or adjusted under 35 U.S.C. 154(b) by 0 days.

(21) Appl. No.: 14/760,776

(22) PCT Filed: Jan. 14, 2014

(86) PCT No.: PCT/JP2014/000122
§ 371 (c)(1),
(2) Date: Jul. 14, 2015

(87) PCT Pub. No.: WO2014/112355
PCT Pub. Date: Jul. 24, 2014

(65) Prior Publication Data
US 2015/0369678 A1    Dec. 24, 2015

(30) Foreign Application Priority Data

Jan. 21, 2013  (JP) .................................. 2013-008211
Jul. 15, 2013  (JP) .................................. 2013-147150
(Continued)

(51) Int. Cl.
*G01L 3/02*    (2006.01)
*G01L 3/10*    (2006.01)
(Continued)

(52) U.S. Cl.
CPC ................. *G01L 3/10* (2013.01); *B23K 26/20* (2013.01); *G01L 1/165* (2013.01); *G01L 1/2287* (2013.01); *Y10T 29/43* (2015.01)

(58) Field of Classification Search
CPC ............. G01L 3/10; G01L 1/165; B23K 26/20
(Continued)

(56) References Cited

U.S. PATENT DOCUMENTS 3,717,029 A * 2/1973 Tveter .................... G01L 3/108
                                                              74/136
3,826,321 A * 7/1974 Rigney ................... B66C 13/16
                                                              177/145
(Continued)

FOREIGN PATENT DOCUMENTS

JP        05-104966 A      4/1993
JP        2002-357493 A    12/2002
JP        2011-094994 A    5/2011

OTHER PUBLICATIONS

International Search Report and Written Opinion of the International Searching Authority mailed Oct. 2, 2014 for the corresponding International application No. PCT/JP2014/000122 (and English translation).
(Continued)

*Primary Examiner* — Max Noori
(74) *Attorney, Agent, or Firm* — Posz Law Group, PLC

(57) ABSTRACT

A torque sensor includes: a base portion fixed to a metal shaft having a rod shape as a measurement object of strain; a strain detection element of a surface acoustic wave type which is arranged in the base portion, and detects the strain of the metal shaft (10) through the base portion; and a fixing portion that is arranged between the base portion and the strain detection element, and fixes the strain detection element to the base portion.

20 Claims, 21 Drawing Sheets

(30) Foreign Application Priority Data

Aug. 27, 2013  (JP) .................................. 2013-175446
Sep. 27, 2013  (JP) .................................. 2013-202048

(51) Int. Cl.
*G01L 1/16* (2006.01)
*B23K 26/20* (2014.01)
*G01L 1/22* (2006.01)

(58) Field of Classification Search
USPC ........................................ 73/862.08, 862.325
See application file for complete search history.

(56) References Cited

U.S. PATENT DOCUMENTS

| | | |
|---|---|---|
| 7,202,589 B2 | 4/2007 | Kalinin et al. |
| 7,886,607 B2 | 2/2011 | Fink et al. |
| 2007/0113669 A1* | 5/2007 | Bernstein ................ G01L 1/165 |
| | | 73/801 |
| 2009/0056155 A1* | 3/2009 | Iso ............................ B43L 7/00 |
| | | 33/483 |
| 2009/0133504 A1 | 5/2009 | Kalinin |
| 2010/0022950 A1* | 1/2010 | Anderson .......... A61B 1/00114 |
| | | 604/100.01 |

OTHER PUBLICATIONS

Office Action mailed Aug. 4, 2015 issued in corresponding JP patent application No. 2013-202048 (and English translation).

* cited by examiner

♦ STRAIN (FLAT SURFACE)
○ STRAIN (METAL FRAME SURFACE)

RELATIONSHIP BETWEEN TORQUE AND STRAIN OF METAL SHAFT

STRAIN

TORQUE

TAPERED ANGLE

TORQUE SENSOR AND MANUFACTURING METHOD THEREFOR

CROSS REFERENCE TO RELATED APPLICATIONS

The present disclosure is a U.S. national stage application of PCT/JP2014/000122 filed on Jan. 14, 2014 and is based on Japanese Patent Application No. 2013-8211 filed Jan. 21, 2013, Japanese Patent Application No. 2013-147150 filed Jul. 15, 2013, Japanese Patent Application No. 2013-175446 filed Aug. 27, 2013 and Japanese Patent Application No. 2013-202048 filed Sep. 27, 2013, the contents of which are incorporated herein by reference.

TECHNICAL FIELD

The present disclosure relates to a torque sensor having a strain detection element of an SAW (surface acoustic wave) type, and a manufacturing method therefor.

BACKGROUND ART

Up to now, a torque measuring device has been proposed in, for example, Patent Literature 1. In the torque measuring device, a strain gauge for detecting a strain of a torque sensor shaft is fitted to an outer surface of the torque sensor shaft. Specifically, a configuration has been proposed in which when the torque sensor shaft is twisted and strained, the strain gauge detects the strain, and outputs an electric signal corresponding to a change in electric resistance attributable to the stain, and a torque value is calculated according to the electric signal.

The strain gauge is configured in such a manner that a metal resistive element is formed on a thin insulator, and stuck onto the torque sensor shaft by adhesive. Therefore, even if the strain gauge undergoes the strain of the torque sensor shaft, the strain gauge is flexibly deformed. For that reason, the strain gauge does not crack due to the deformation of the torque sensor shaft.

In this example, when not the strain gauge but a torque sensor of the SAW type is employed as device for detecting the strain, the torque sensor is configured as a sensor chip of a hard piezoelectric body. Therefore, the hard piezoelectric body is fixed directly to the torque sensor shaft by adhesive. For that reason, when the adhesive is crept or deteriorated, the strain of the torque sensor shaft is not transmitted to the hard torque sensor of the SAW type, resulting in such a problem that a detection precision of the strain decreases.

PRIOR ART LITERATURES

Patent Literature

Patent Literature 1: JP-2011-94994 A

SUMMARY OF INVENTION

It is an object of the present disclosure to provide a torque sensor with a structure capable of surely transmitting a strain of a metal shaft to be measured to a strain detection element of an SAW type. It is an object of the present disclosure to provide a method for manufacturing the torque sensor.

According to a first aspect of the present disclosure, a torque sensor includes: a base portion fixed to a metal shaft having a rod shape as a measurement object of strain; a strain detection element of an surface acoustic wave type which is arranged in the base portion, and detects the strain of the metal shaft through the base portion; and a fixing portion that is arranged between the base portion and the strain detection element, and fixes the strain detection element to the base portion.

In the torque sensor described above, since the strain detection element is fixed to the base portion by the fixing portion, the fixing portion and the strain detection element are unbreakable due to a difference in thermal expansion coefficient between the fixing portion and the strain detection element, and the metal shaft. Therefore, the strain of the metal shaft can be surely transmitted to the strain detection element through the base portion and the fixing portion.

According to a second aspect of the present disclosure, a method for manufacturing a torque sensor that detects a strain of a metal shaft having a bar shape as a measurement object of strain using a strain detection element of an surface acoustic wave type through a metal frame, the method includes: forming a flat surface on an outer surface of the metal shaft; preparing the metal frame having a plate shape with one surface, another surface opposite to the one surface, and a side surface that contacts with the one surface and the another surface; fixing the strain detection element onto one surface of the metal frame through glass; and arranging the metal frame on the flat surface, and bonding and fixing the metal frame to the flat surface in a state where the another surface of the metal frame, to which the strain detection element is fixed, faces a flat surface side.

In the method for manufacturing the torque sensor described above, since the strain detection element is fixed to the base portion by the fixing portion, the fixing portion and the strain detection element are unbreakable due to a difference in thermal expansion coefficient between the fixing portion and the strain detection element, and the metal shaft. Therefore, the strain of the metal shaft can be surely transmitted to the strain detection element through the base portion and the fixing portion.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Figure 1:
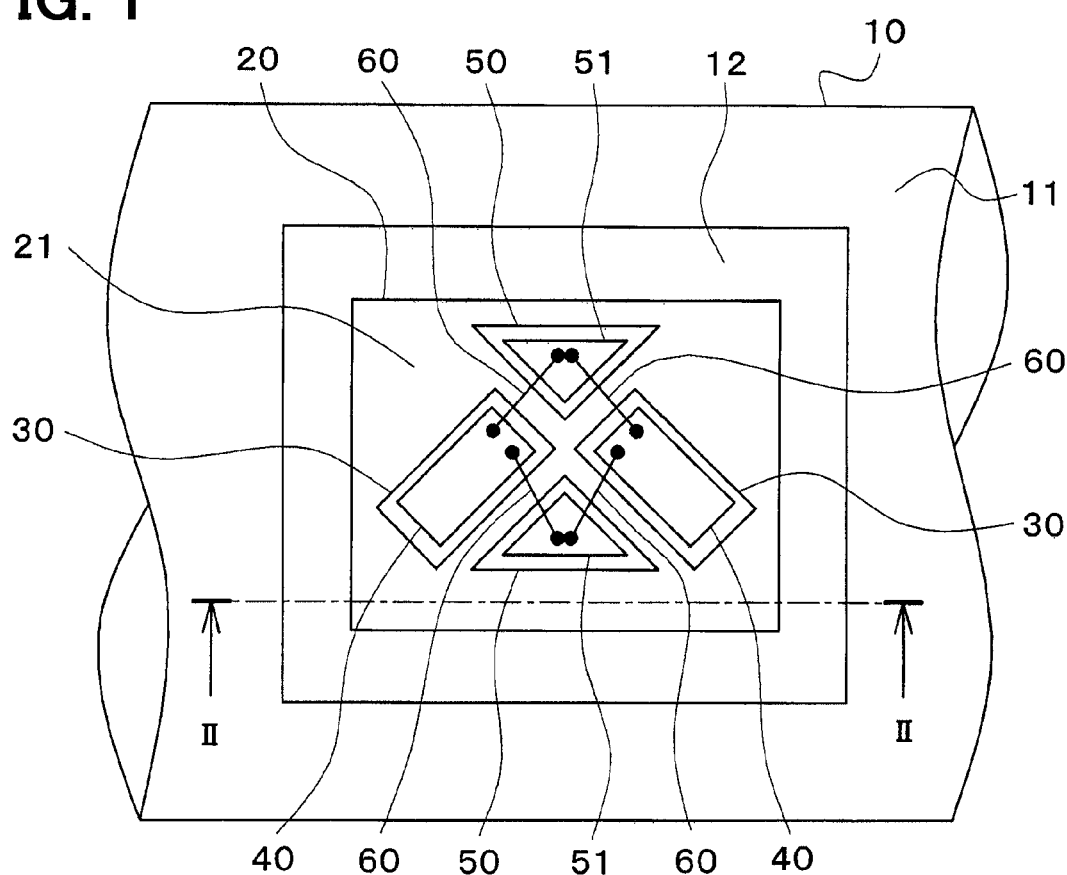
FIG. 1 is a plan view of a torque sensor according to a first embodiment of the present disclosure.

Embodiments of the present disclosure will be described below with reference to the drawings. In the following respective embodiments, parts identical with or equivalent to each other are denoted by the same symbols in the drawings.

(First Embodiment)

Subsequently, a first embodiment of the present disclosure will be described with reference to the drawings. As illustrated in FIG. 1, a torque sensor according to this embodiment includes a metal shaft 10, a metal frame 20, glass 30, strain detection elements 40, and printed boards 50.

The metal shaft 10 is a so-called shaft of a bar shape, which is an object to be measured in strain. The metal shaft 10 has a flat surface 12 in a surface 11 thereof. The flat surface 12 is a so-called counterbore. The metal shaft 10 is made of, for example, S35C. A thermal expansion coefficient α of S35C is 11.3 ppm/K.

Figure 2:
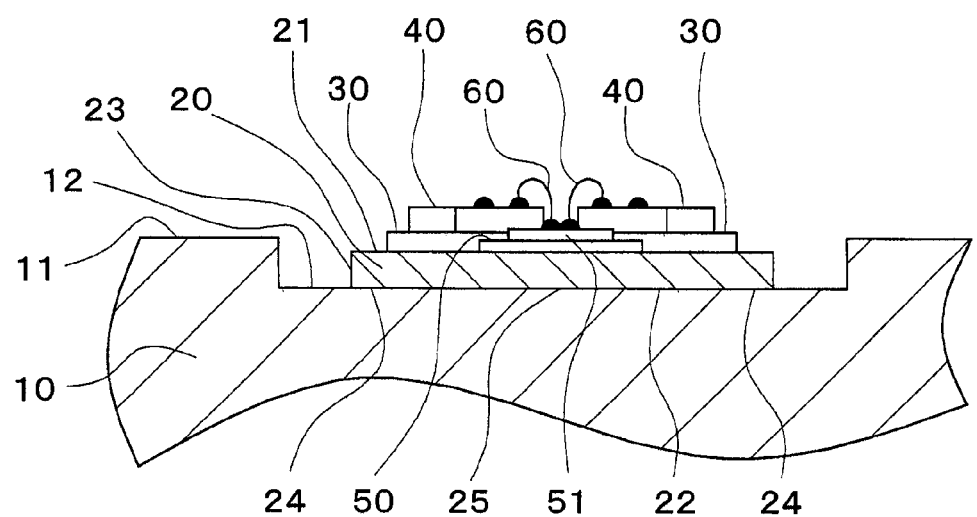
FIG. 2 is a cross-sectional view taken along a line II-II of FIG. 1.

As illustrated in FIG. 2, the metal frame 20 is a plate-like part having one surface 21, another surface 22 on the opposite side of the one surface 21, and a side surface 23 that comes in contact with the one surface 21 and the another surface 22. As illustrated in FIG. 1, in this embodiment, planar shapes of the one surface 21 and the another surface 22 of the metal frame 20 are rectangular. A thickness of the metal frame 20 is, for example, 0.5 mm. As illustrated in FIG. 2, the metal frame 20 is arranged on the flat surface 12 in a state where the another surface 22 faces the flat surface 12 side of the metal shaft 10, and an outer edge 24 of the another surface 22 is joined and fixed to the flat surface 12 of the metal shaft 10 by laser welding.

In this example, the another surface 22 of the metal frame 20 is welded around the outer edge 24 by laser. For that reason, a center portion 25 of the another surface 22 of the metal frame 20 comes in contact with the flat surface 12 of the metal shaft 10, but is not joined to the flat surface 12.

The metal frame 20 is made of austenitic stainless. Specifically, SUS304 is employed as the metal frame 20. A thermal expansion coefficient α of SUS304 is 17.3 ppm/K.

The glass 30 is a fixing member that is arranged between the one surface 21 of the metal frame 20 and the strain detection elements 40, for fixing the strain detection elements 40 to the one surface 21 of the metal frame 20. The glass 30 is made of, for example, lead-based material. The thermal expansion coefficient α of the lead-based glass 30 of this type is equal to or larger than 10.0, and equal to or smaller than 16.0, and specifically 15.4 ppm/K. Further, a sintering temperature of the lead-based glass 30 is lower than 400° C., and a glass transition temperature thereof is 220° C. In other words, the glass 30 is made of low melting point glass.

Figure 3:
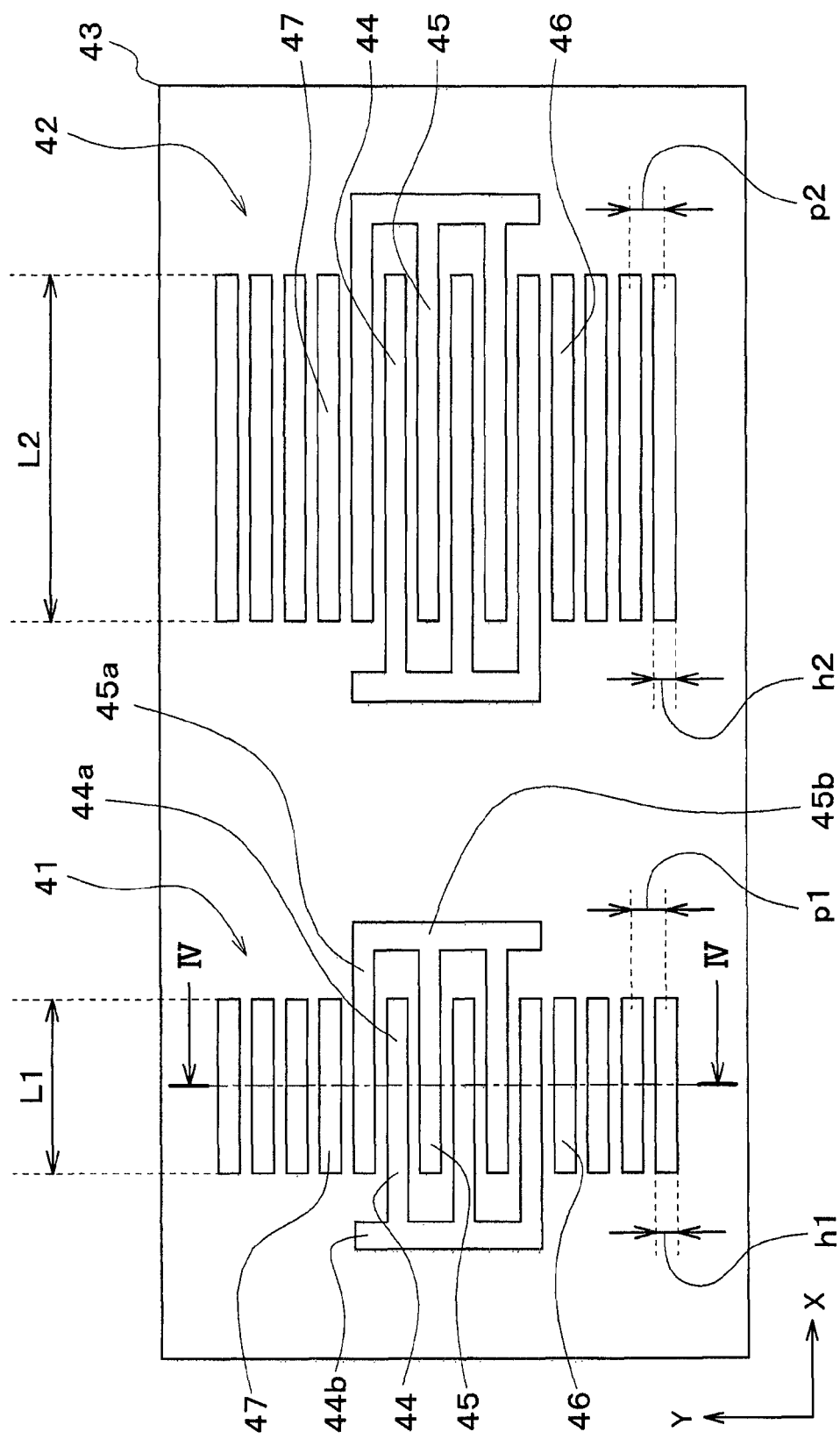
FIG. 3 is a plan view of a strain detection element.

Each of the strain detection elements 40 is a strain measurement sensor of an SAW type which is arranged on the one surface 21 of the metal frame 20, and detects the strain of the metal shaft 10 through the metal frame 20. Specifically, as illustrated in FIG. 3, each of the strain detection elements 40 includes two first and second SAW resonators 41 and 42. Although not shown, the strain detection elements 40 include a first oscillation circuit having the first SAW resonator 41 as a first surface acoustic wave element, and a second oscillation circuit having the second SAW resonator 42 as a second surface acoustic wave element, and two oscillators are formed by the first and second oscillation circuits.

Figure 4:
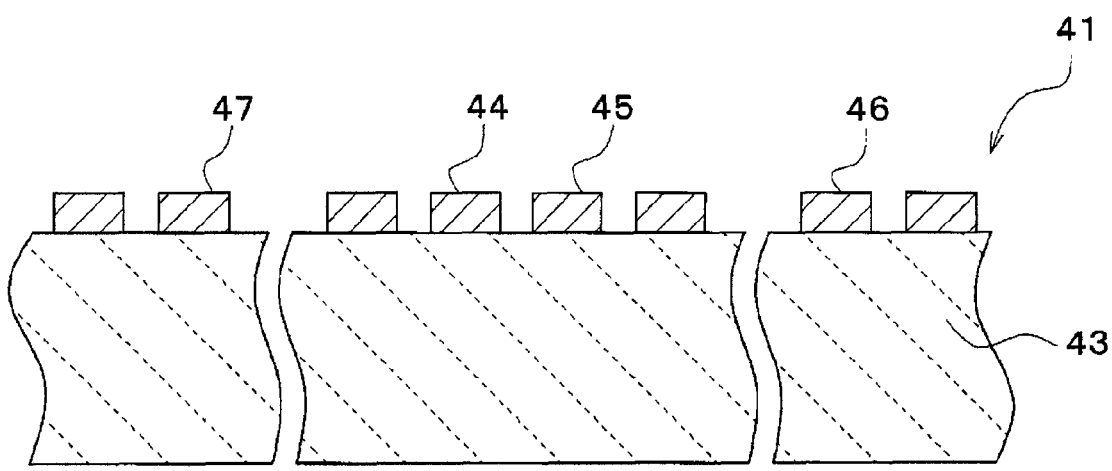
FIG. 4 is a cross-sectional view taken along a line IV-IV of FIG. 3.

As illustrated in FIG. 4, the strain detection element 40 includes a piezoelectric substrate 43 made of single crystal of a piezoelectric material, and comb-like electrodes 44, 45, and reflectors 46, 47 which are formed on the piezoelectric substrate 43. The piezoelectric material is made of, for example, lithium niobate (LN). The thermal expansion coefficient α of the piezoelectric substrate 43 is 16.0 ppm/K.

The comb-like electrodes 44, 45 and the reflectors 46, 47 are made of metal material such as aluminum. In order to protect the comb-like electrodes 44, 45 and the reflectors 46, 47 made of the above material, a lead-based material low in the glass transition temperature is employed as the glass 30 of the low melting point which can be sintered at 450° C. or lower as described above.

As illustrated in FIG. 3, the comb-like electrodes 44 and 45 excite a surface acoustic wave in the piezoelectric substrate 43. Specifically, the comb-like electrodes 44 and 45 include multiple comb-like portions 44a and 45a, and bus bars 44b and 45b that couple the multiple comb-like portions 44a and 45a with each other, respectively. The comb-like portions 44a and 45a extend in parallel to each other and in an X-axial direction. The comb-like portions 44a and 45a of the comb-like electrodes 44 and 45 are the same in number as each other, and the respective comb-like portions 44a and 45a are alternately arranged one by one. The surface acoustic wave propagates in a direction perpendicular to an extending direction of the comb-like portions 44a and 45a, that is, a Y-axial direction by the pair of comb-like electrodes 44 and 45.

The reflectors 46 and 47 are arranged on both sides of the comb-like electrodes 44 and 45 in the Y-axial direction, and reflect the surface acoustic wave propagated from the comb-like electrodes 44 and 45. The reflectors 46 and 47 are configured by multiple electrodes aligned in the Y-axial direction. One electrode extends in parallel to the comb-like portions 44a and 45a, and the respective electrodes are arranged in parallel to each other.

In this embodiment, the first and second SAW resonators 41 and 42 are identical with each other in the number of pairs of the comb-like electrodes 44 and 45, the number of electrodes configuring the reflectors 46 and 47, respective electrode widths h1 and h2 configuring the comb-like electrodes 44, 45, and the reflectors 46, 47, and pitches p1 and p2 of the respective electrodes. Since the respective electrode widths h1 and h2 are identical with each other, and the pitches p1 and p2 of the respective electrodes are identical with each other, metalization ratios (ratio of the widths of the respective electrodes and the widths of free surfaces in the Y-axial direction) are also identical with each other. The number of pairs of the comb-like electrodes 44 and 45 represents the number of comb-like portions 44a and 45a provided in the pair of comb-like electrodes 44 and 45, respectively, and the pitches p1 and p2 of the respective electrodes are intervals between centers of the adjacent electrodes.

The first and second SAW resonators 41 and 42 are different from each other in cross finger widths L1 and L2 of the respective electrodes configuring the comb-like electrodes 44, 45, and the reflectors 46, 47, and the cross finger width L2 of the second SAW resonator 42 is longer than the cross finger width L1 of the first SAW resonator 41. With this configuration, an oscillation frequency of the oscillation circuit having the first SAW resonator 41 is different from an oscillation frequency of the oscillation circuit having the second SAW resonator 42, and a difference frequency which is a difference between those oscillation frequencies becomes a minute frequency. In other words, the respective strain detection elements 40 are set to a desired minute difference frequency.

As illustrated in FIG. 1, the two strain detection elements 40 are arranged in a reverse V-shape so that longitudinal directions of the respective strain detection elements 40 intersect with each other at a predetermined angle. According to the above arrangement, when the metal shaft 10 strains due to distortion, a compressive strain is generated in one of the strain detection elements 40, and a tensile strain is generated in the other strain detection element 40. The respective strain detection elements 40 detect the strain as a change in a difference between the oscillation frequencies of the first and second SAW resonators 41 and 42.

The printed boards 50 are relay parts for electrically connecting the strain detection elements 40 to the external. For that reason, each of the printed boards 50 includes a terminal portion 51. The printed boards 50 are installed on the one surface 21 of the metal frame 20, for example, by adhesive. The terminal portions 51 are connected to the bus bars 44b and 45b of the strain detection elements 40 by bonding wires 60. In FIG. 1, the bonding wires 60 for connecting the terminal portion 51 to the external are omitted.

The configuration of the torque sensor according to this embodiment is described above. The above torque sensor is mounted in a vehicle such as an automobile, and used for control of the vehicle.

Next, a method for manufacturing the torque sensor illustrated in FIG. 1 will be described. The metal shaft 10 having the flat surface 12 is first prepared. The plate-like metal frame 20 is also prepared.

Subsequently, the strain detection elements 40 illustrated in FIG. 3 are prepared, and each of the strain detection elements 40 is fixed to the one surface 21 of the metal frame 20 through the glass 30. Specifically, the solid glass 30 is arranged on the one surface 21 of the metal frame 20, and the glass 30 is heated to a glass transition temperature or higher, and melted into a paste state. In this state, the strain detection elements 40 are placed on the glass 30, and the glass 30 is cooled to again solidify the glass 30. With the above process, the strain detection elements 40 are fixed onto the one surface 21 of the metal frame 20.

The printed boards 50 on each of which the terminal portion 51 is formed are prepared, and fixed at predetermined positions of the one surface 21 of the metal frame 20 by adhesive. The strain detection elements 40 and the terminal portions 51 are connected to each other by the bonding wires 60.

Figure 5:
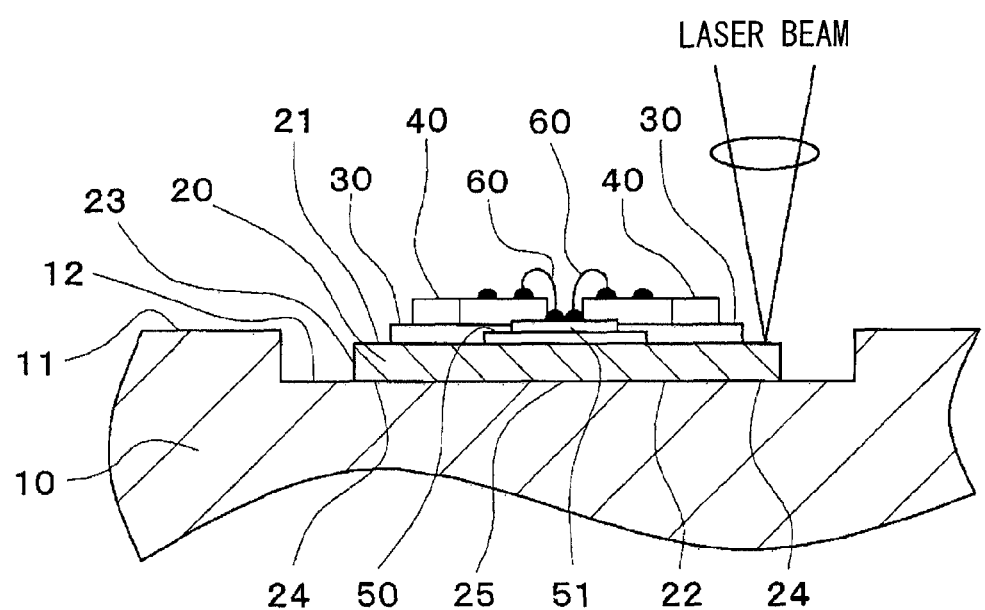
FIG. 5 is a diagram illustrating a process of manufacturing a torque sensor according to the first embodiment.

Thereafter, the metal frame 20 is arranged on the flat surface 12 of the metal shaft 10 so that the another surface 22 of the metal frame 20 onto which the strain detection elements 40 are fixed faces the flat surface 12 side. Then, as illustrated in FIG. 5, the metal frame 20 is laser welded to the flat surface 12 of the metal shaft 10 around the outer edge 24 of the another surface 22 of the metal frame 20 by a laser beam. With the above process, the metal frame 20 is joined and fixed to the flat surface 12 of the metal shaft 10.

Subsequently, the terminal portions 51 and other electric circuit components are connected to each other by bonding wires not shown, as a result of which signals of the strain detection elements 40 can be output to the external. In this way, the torque sensor is completed.

In this example, the piezoelectric substrate 43 that generates the surface acoustic wave (SAW) is made of hard ceramic material. In order to measure the torque of the metal shaft 10, there is a need to accurately transmit the strain of the metal shaft 10, which is generated due to the torque, to the hard piezoelectric substrate 43 of each of the strain detection elements 40. In order to achieve this, not the adhesive that is easily deformed or deteriorated, but the glass 30 having a low melting point high in stiffness and excellent in durability is preferable.

The strain detection elements 40 are not fixed directly to the flat surface 12 of the metal shaft 10 by the glass 30, but the strain detection elements 40 are fixed to the metal frame 20 by the glass 30. This is because the thermal expansion coefficients of the strain detection elements 40 and the metal shaft 10 are different from each other as described above, and therefore when the strain detection elements 40 are stuck directly to the metal shaft 10 with the use of the glass 30, a stress caused by contraction is generated in the strain detection elements 40 and the glass 30 when the glass 30 is cooled after glass paste sintering. In other words, the strain detection elements 40 and the glass 30 are cracked or peeled from each other. However, when the metal frame 20 having the same thermal expansion coefficient as that of the strain detection elements 40 mediates between the strain detection elements 40 and the metal shaft 10, the glass 30 of the low melting point having the same thermal expansion coefficient is available. This makes it possible to prevent the strain detection elements 40 and the glass 30 from being cracked in a cooling process after the glass paste sintering due to a difference in the thermal expansion coefficient between the strain detection elements 40 and the metal shaft 10.

The metal shaft 10 and the metal frame 20 are different in the thermal expansion coefficient from each other, but are not cracked or teared because metal is expanded and contracted. Therefore, no problem arises in the difference of the thermal expansion coefficient between the metal shaft 10 and the metal frame 20.

As described above, this embodiment is characterized by a configuration in which the strain detection elements 40 are not stuck directly onto the metal shaft 10, but the strain detection elements 40 are integrated with the metal frame 20 by the glass 30 of the low melting point, and the metal frame 20 is further joined and fixed to the metal shaft 10.

According to the above configuration, the metal shaft 10 can be joined to the metal frame 20 having the same thermal expansion coefficient as that of the strain detection elements 40 with the use of the glass 30 of the low melting point having the same thermal expansion coefficient as that of the strain detection elements 40 and the metal frame 20. This makes it possible to prevent the peeling and cracking of the strain detection elements 40, and also the cracking of the glass 30 due to the difference in the thermal expansion coefficient at the time of sintering the glass paste. In other words, with the provision of the metal frame 20, the glass 30 and the strain detection elements 40 can be prevented from being cracked due to the difference in the thermal expansion coefficient between the glass 30 and the strain detection elements 40, and the metal shaft 10.

Since the outer edge 24 of the another surface 22 of the metal frame 20 is circumferentially welded to the flat surface 12 of the metal shaft 10 by laser, even if the center portion 25 of the another surface 22 of the metal frame 20 is not joined to the metal shaft 10, the strain can be transmitted efficiently. Therefore, the strain of the metal shaft 10 to be measured can be surely transmitted to the strain detection elements 40 of the SAW type, and a reduction in the detection precision of the strain can be further suppressed.

In a correspondence between the description of this embodiment and the claims, the glass 30 corresponds to "fixing portion" in the claims.

(Second Embodiment)

Figure 6:
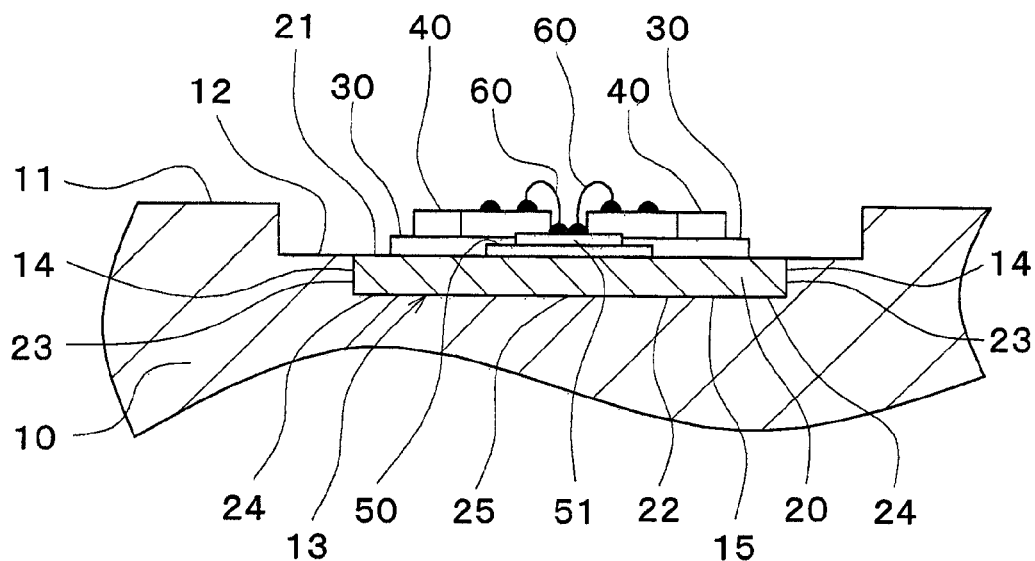
FIG. 6 is a cross-sectional view of a torque sensor according to a second embodiment of the present disclosure.

In this embodiment, portions different from the first embodiment will be described. As illustrated in a cross-sectional view of FIG. 6, a metal shaft 10 has a depression 13 in which a part of a flat surface 12 is recessed in the flat surface 12. A plane size of the depression 13 is identical with that of one surface 21 and another surface 22 of the metal frame 20. A depth of the depression 13 is identical with a thickness of the metal frame 20. The depression 13 is a part of the flat surface 12. FIG. 6 is a diagram corresponding to a cross-section II-II of FIG. 1.

The metal frame 20 is fitted into the depression 13 of a flat surface 12 of the metal shaft 10. The metal frame 20 is welded to the depression 13 by laser so that a side surface 23 of the metal frame 20 is integrated with a wall surface 14 of the depression 13. In this embodiment, the another surface 22 of the metal frame 20 comes into contact with a bottom surface 15 of the depression 13.

An outer edge 24 of the another surface 22 of the metal frame 20 may be slightly melted in conducting laser welding, and joined to the metal shaft 10. However, in this embodiment, only the side surface 23 of the metal frame 20 is integrated with the wall surface 14 of the depression 13. The wall surface 14 and the bottom surface 15 of the depression 13 are parts of the flat surface 12.

Figure 7:
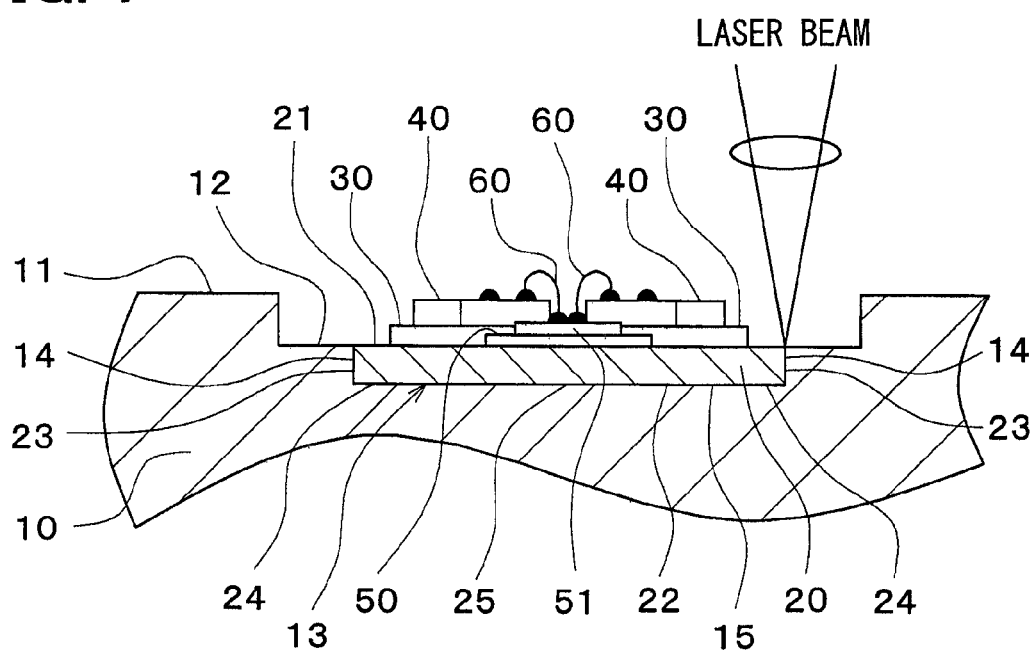
FIG. 7 is a diagram illustrating a process of manufacturing the torque sensor according to the second embodiment.

Next, a method for manufacturing the torque sensor according to this embodiment will be described. In this embodiment, the metal shaft 10 in which the depression 13 is formed in the flat surface 12 is prepared. After the strain detection elements 40 have been fixed to the metal frame 20 as described above, the metal frame 20 is fitted into the depression 13. Thereafter, as illustrated in FIG. 7, the side surface 23 is welded to the wall surface 14 by a laser beam so that the side surface 23 of the metal frame 20 is integrated with the wall surface 14 of the depression 13. With the above process, the another surface 22 of the metal frame 20 merely comes into contact with the bottom surface 15 of the depression 13. Subsequent processes are identical with those in the first embodiment.

The present inventors have confirmed through experiment that the side surface 23 of the metal frame 20 is merely integrated with the metal shaft 10 with the results that even if the overall another surface 22 of the metal frame 20 is not joined to the metal shaft 10, the strain of the metal shaft 10 can be accurately transmitted to the metal frame 20.

Figure 8A:
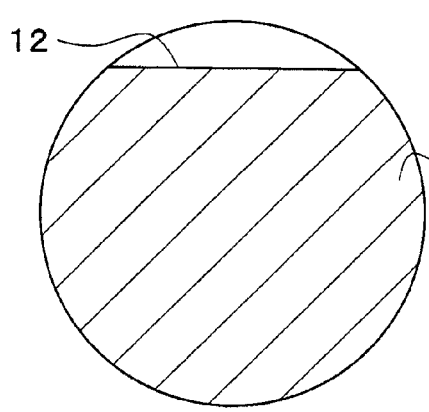
FIG. 8A is a cross-sectional view of a metal shaft when measuring a strain of a flat surface of a metal shaft.
Figure 8B:
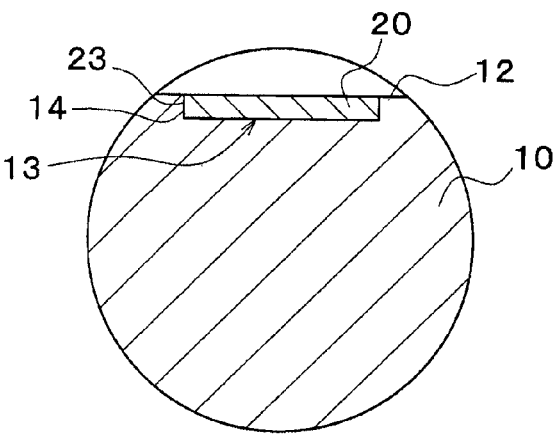
FIG. 8B is a cross-sectional view of the metal shaft and a metal frame when the metal frame is fixed to a depression formed in the flat surface of the metal shaft to measure the strain of the metal frame.

Specifically, the metal shaft 10 having the flat surface 12 is prepared as illustrated in FIG. 8A, and a strain gauge not shown is installed on the flat surface 12 to measure the strain of the metal shaft 10. The metal shaft 10 in which the metal frame 20 is fitted into the depression 13 formed in the flat surface 12 of the metal shaft 10, and the side surface 23 of the metal frame 20 is welded to the wall surface 14 of the depression 13 by laser as illustrated in FIG. 8B is prepared. The strain gauge not shown is installed on one surface of the metal frame 20 to measure the strain of the metal shaft 10. The measurement results of those strains are shown in FIG. 9.

Figure 9:
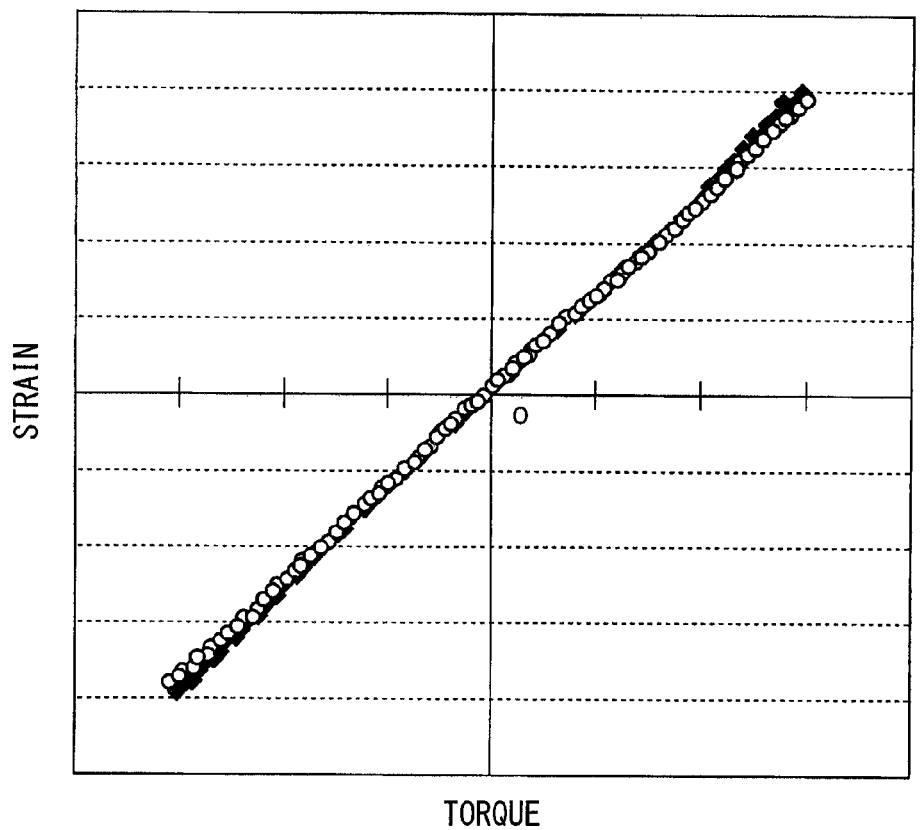
FIG. 9 is a diagram illustrating a relationship between a torque and a strain of the metal shaft.

As illustrated in FIG. 9, a torque calculated according to the strain of the metal shaft 10, and a torque calculated according to the strain of the metal frame 20 have substantially the same value. This clarifies that the intervention of the metal frame 20 does not affect the detection of the strain. In other words, the depression 13 is provided in the flat surface 12 of the metal shaft 10, and the wall surface 14 of the depression 13 is integrated with the side surface 23 of the metal frame 20 by laser welding, thereby being capable of more surely transmitting the strain of the metal shaft 10.

The experimental results according to this embodiment are the same even in a configuration where the outer edge 24 of the another surface 22 of the metal frame 20 is circumferentially welded to the flat surface 12 by laser as in the first embodiment.

(Third Embodiment)

Figure 10:
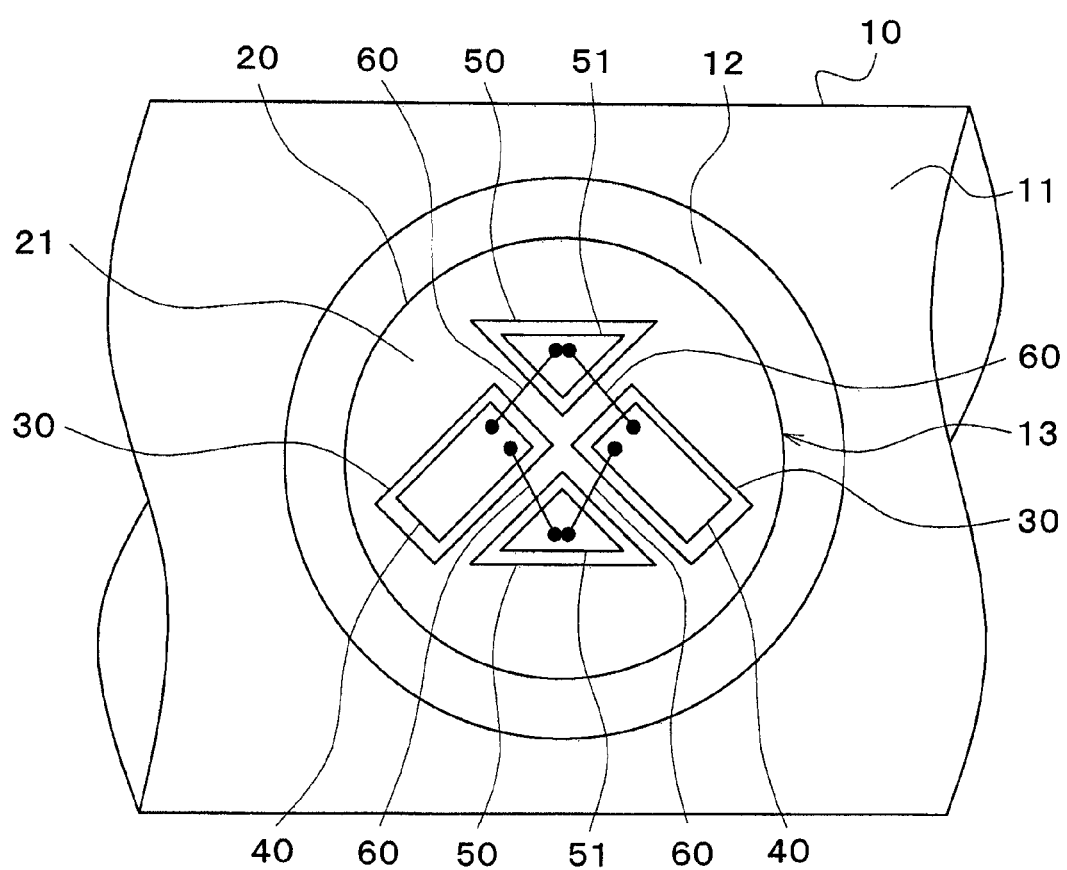
FIG. 10 is a plan view of a torque sensor according to a third embodiment of the present disclosure.

In this embodiment, portions different from the second embodiment will be described. As illustrated in FIG. 10, the respective planar shapes of the flat surface 12 and the depression 13 of the metal shaft 10, and the one surface 21 and the another surface 22 of the metal frame 20 are circular. The plane sizes of the circles of the depression 13, and the one surface 21 and the another surface 22 of the metal frame 20 are the same as each other. When the respective planar shapes are made circular as described above, the flat surface 12 and the depression 13 of the metal shaft 10, and the metal frame 20 can be easily formed. For that reason, a detection precision of the strain can be improved.

Similarly, in a structure having no depression 13 in the flat surface 12 of the metal shaft 10 as in the first embodiment, the respective planar shapes of the flat surface 12 of the metal shaft 10, and the one surface 21 and the another surface 22 of the metal frame 20 may be circular.

(Fourth Embodiment)

Figure 11:
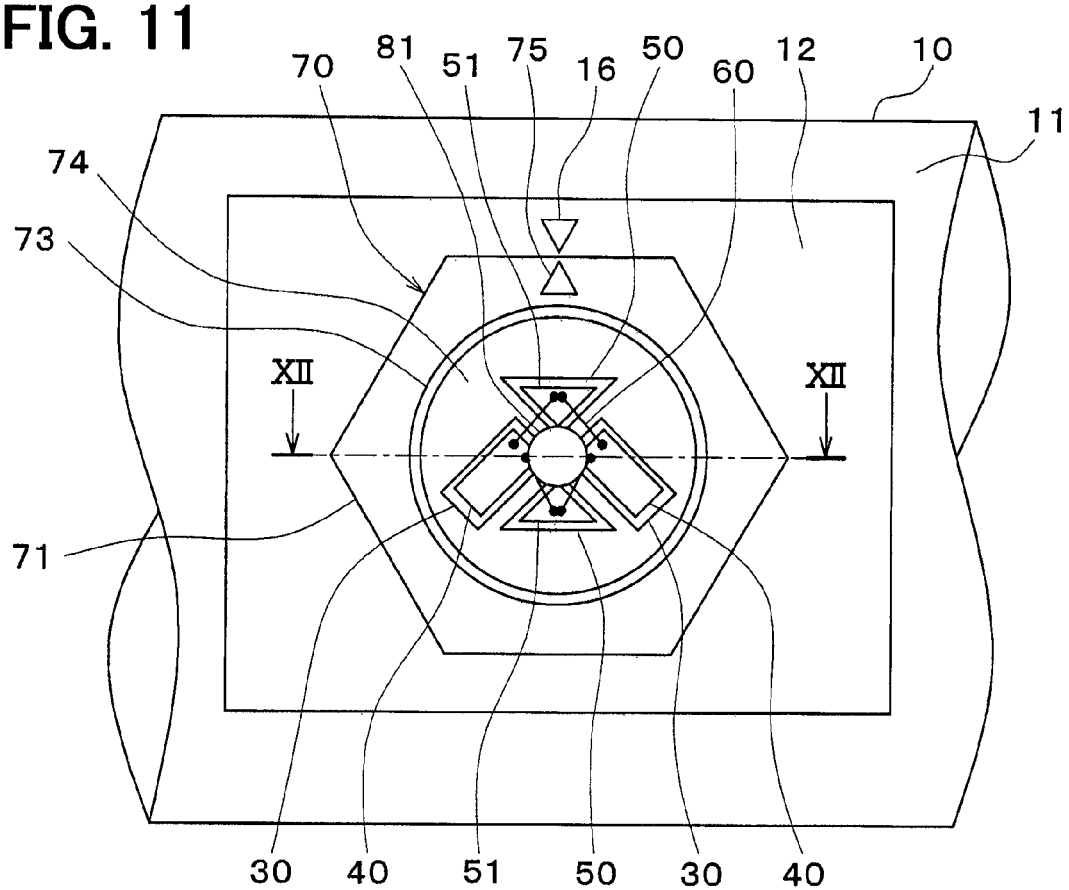
FIG. 11 is a plan view of a torque sensor according to a fourth embodiment of the present disclosure.
Figure 12:
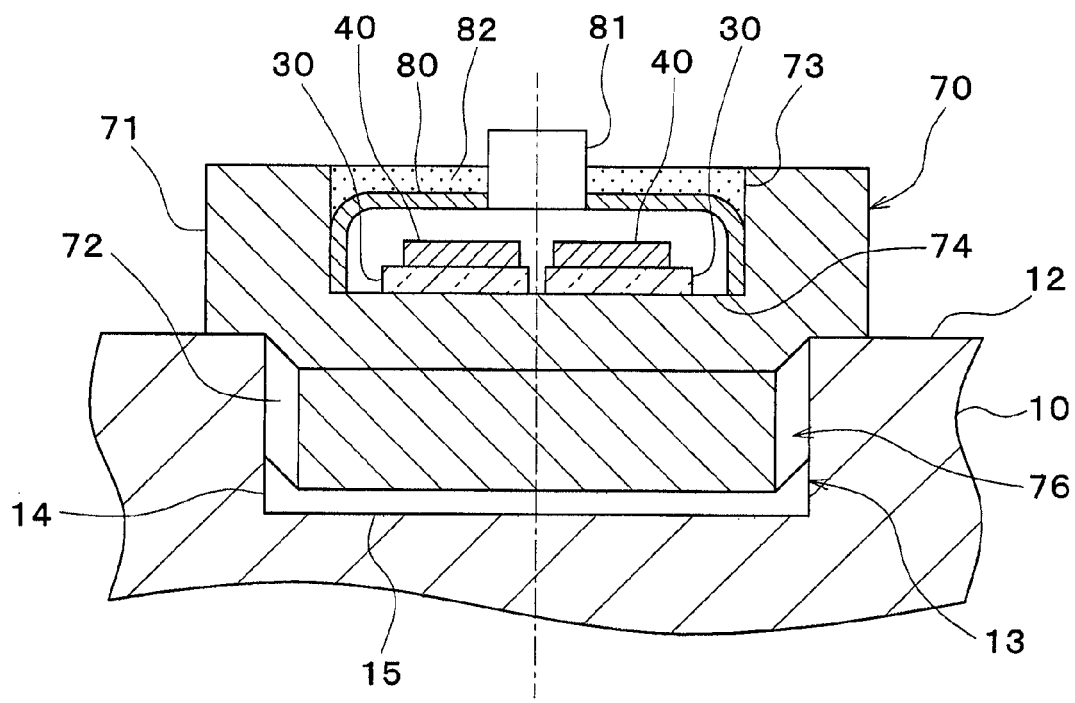
FIG. 12 is a cross-sectional view taken along a line XII-XII of FIG. 11.

In this embodiment, portions different from the first to third embodiments will be described. As illustrated in FIGS. 11 and 12, a torque sensor includes a metal shaft 10, a bolt 70, glass 30, strain detection elements 40, and printed boards 50.

The metal shaft 10 has a depression 13 in which a flat surface 12 is recessed, in the flat surface 12. A planar shape of a bottom surface 15 of the depression 13 in the flat surface 12 of the metal shaft 10 is circular. A wall surface 14 of the depression 13 is threaded. In other words, an internal thread for fixing a bolt 70 is formed in the wall surface 14 of the depression 13.

The bolt 70 is a so-called hexagon bolt having a head 71 of a regular hexagonal prism, and a screw portion 72 in which the side surface is threaded into an external thread. The head 71 has a groove portion 73 recessed toward the screw portion 72 side. The strain detection elements 40 are fixed to a bottom 74 of the groove portion 73 through glass 30, and printed boards 50 are fixed to the bottom 74 of the groove portion 73 through adhesive. When the bolt 70 is fastened to the metal shaft 10, the bottom 74 of the groove portion 73 is arranged at a position higher than a surface 11 of the metal shaft 10.

The bolt 70 has a cap 80 for coating and protecting the strain detection elements 40 and so on. The cap 80 is equipped with an extraction portion 81 for extracting lines from the printed boards 50 to the external. The cap 80 is arranged in the groove portion 73, and covered with a potting material 82 so as to be fixed to the head 71 of the bolt 70.

The bolt 70 configured as described above is fastened to the metal shaft 10 by screwing the screw portion 72 to the depression 13 of the metal shaft 10. For example, with the provision of an embedded member 76 such as anaerobic adhesive between the wall surface 14 of the depression 13 and the screw portion 72, slip of a contact surface (frank portion) where a thread of the wall surface 14 comes into contact with a thread of the screw portion 72 can be prevented. In addition, the hysteresis of the detected values of the strain can be reduced.

It is preferable that the thread of the screw portion 72 is finer. This makes it possible to reduce a depth of the depression 13 provided in the metal shaft 10. It is needless to say that the thread of the wall surface 14 of the depression 13 is also formed to be finer.

Further, in fastening the bolt 70 to the metal shaft 10 by screwing, in order to detect the strain generated in the metal shaft 10 due to the torque by the strain detection elements 40, the strain detection elements 40 need to be attached in a direction of ±45° to a twist direction of the metal shaft 10 as with a strain gauge. For that reason, a first mark 75 such as a notch is provided on the head 71 of the bolt 70. The first mark 75 functions to indicate an orientation of the strain detection elements 40 with respect to the metal shaft 10. Likewise, a second mark 16 such as a notch is provided on the flat surface 12 of the metal shaft 10. The second mark 16 functions to indicate a position of the first mark 75.

Aside from the respective marks 16 and 75 formed of the notches, a part of the shape of the bolt 70 and a part of the shape of the metal shaft 10 may be used as the first marks 16 and 75. Therefore, the first mark 75 of the bolt 70 matches the second mark 16 of the metal shaft 10 with the results that a predetermined fastening force can be obtained while a positional relationship of the strain detection elements 40 to the metal shaft 10 is ensured.

In this example, the first mark 75 is provided in correspondence with a cut start position of the external thread of the screw portion 72. For example, the first mark 75 is provided in the bolt 70 so that the first mark 75 matches a cut start position of the external thread. Likewise, the second mark 16 provided on the metal shaft 10 is provided in correspondence with a cut start position of the internal thread formed on the wall surface 14 of the depression 13. For example, the second mark 16 is provided on the metal shaft 10 so that the second mark 16 matches the cut start position of the internal thread. In order to match the cut start position of the external thread of the screw portion 72 of the bolt 70 with the first mark 75, and in order to match the cut start position of the internal thread of the depression 13 of the metal shaft 10 with the second mark 16, it is preferable that the screw shape is formed by a planetary tap.

As described above, the strain detection elements 40 are installed in the bolt 70, and the bolt 70 is fastened to the metal shaft 10, as a result of which a stress caused by the strain generated in the metal shaft 10 can be surely transmitted from the wall surface 14 of the depression 13 to the screw portion 72 and the head 71 of the bolt 70. Since the bolt 70 may be fastened to the metal shaft 10 with a predetermined fastening force, the strain detection elements 40 can be easily fixed to the metal shaft 10 through the bolt 70.

(Fifth Embodiment)

Figure 13:
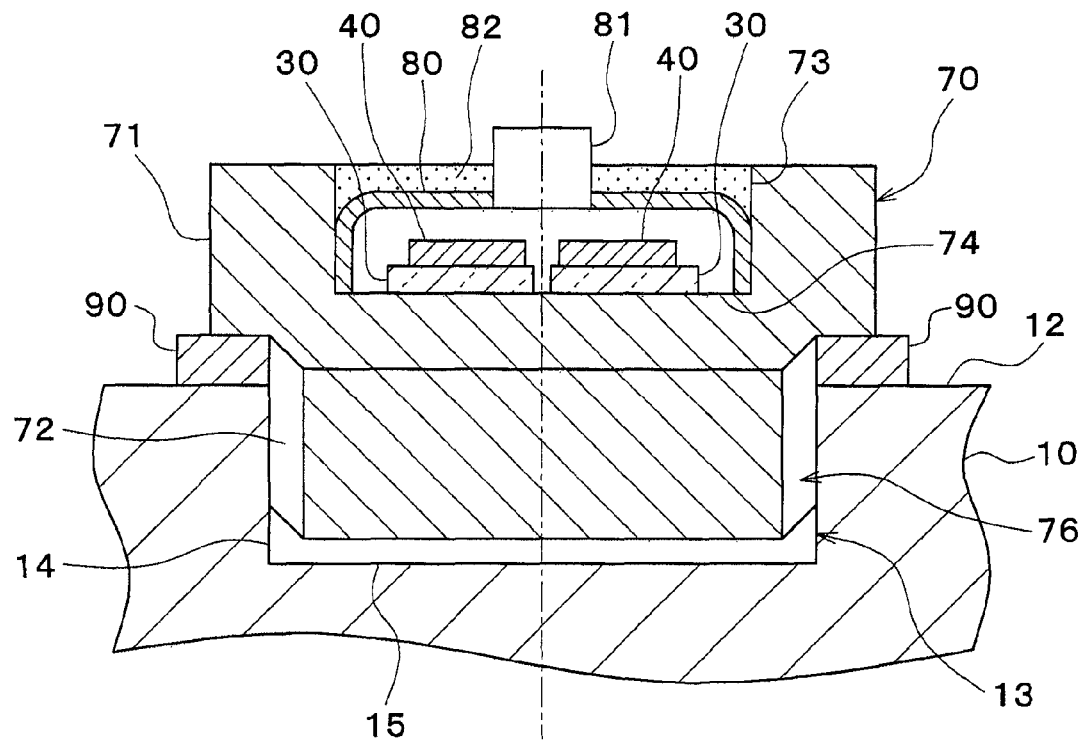
FIG. 13 is a cross-sectional view of a torque sensor according to a fifth embodiment of the present disclosure.

In this embodiment, portions different from the fourth embodiment will be described. In this embodiment, as illustrated in FIG. 13, a torque sensor includes a washer 90 disposed between a metal shaft 10 and a bolt 70. The washer 90 is held between a head 71 of the bolt 70 and a flat surface 12 of the metal shaft 10. The washer 90 is made of a metal material such as copper. FIG. 13 is a cross-sectional view corresponding to the cross-section XII-XII of FIG. 11.

As described above, the washer 90 intervenes between the metal shaft 10 and the bolt 70 with the results that when the bolt 70 is positioned with respect to the metal shaft 10 on the basis of the first marks 16 and 75, the bolt 70 can be fastened to the metal shaft 10 with the predetermined fastening force. In other words, the fastening force of the bolt 70 to the metal shaft 10 can be managed with high precision. In particular, when a variation in the fastening force at a predetermined position to the metal shaft 10 is large for each bolt 70, the variation in the fastening force can be suppressed with the intervention of the washer 90.

(Sixth Embodiment)

Figure 14:
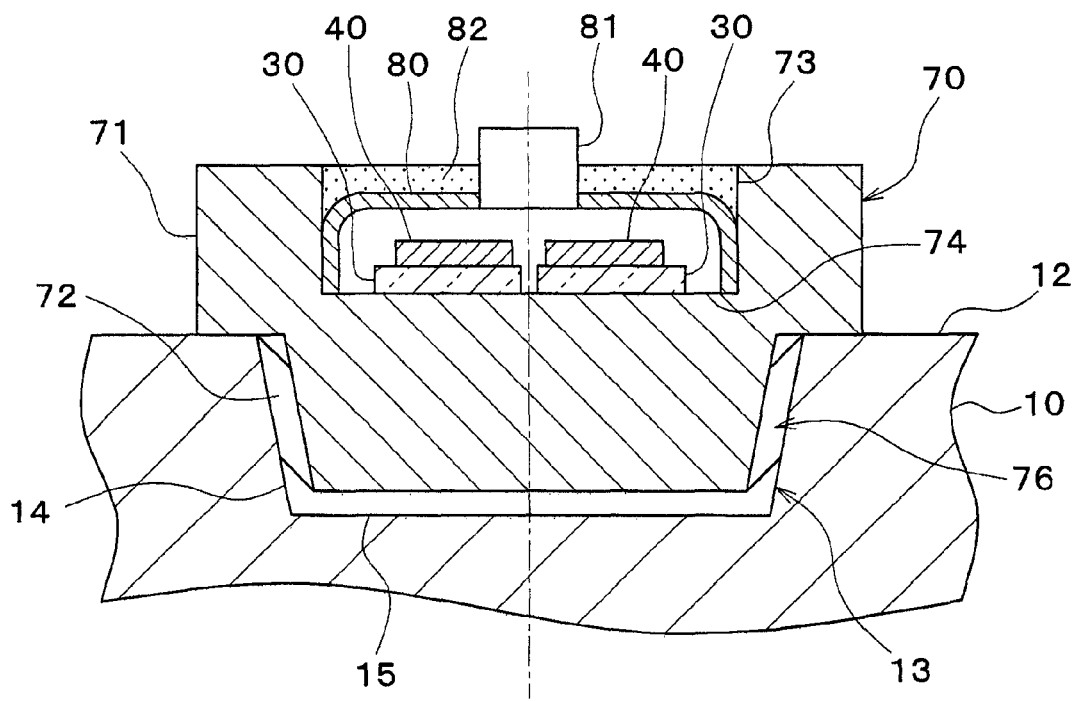
FIG. 14 is a cross-sectional view of a torque sensor according to a sixth embodiment of the present disclosure.

In this embodiment, portions different from the fourth and fifth embodiments will be described. In this embodiment, as illustrated in FIG. 14, a screw portion 72 of a bolt 70 is tapered to reduce a diameter thereof toward a leading end of the screw portion 72. Along with this configuration, a wall surface 14 of a depression 13 provided in a flat surface 12 of a metal shaft 10 is also tapered to reduce a diameter thereof toward a bottom 74 of the depression 13.

Since the screw portion 72 of the bolt 70 and the wall surface 14 of the depression 13 are tapered as described above, contact surfaces (frank portions) of the respective threads are held. For that reason, the hysteresis can be reduced.

Figure 15:
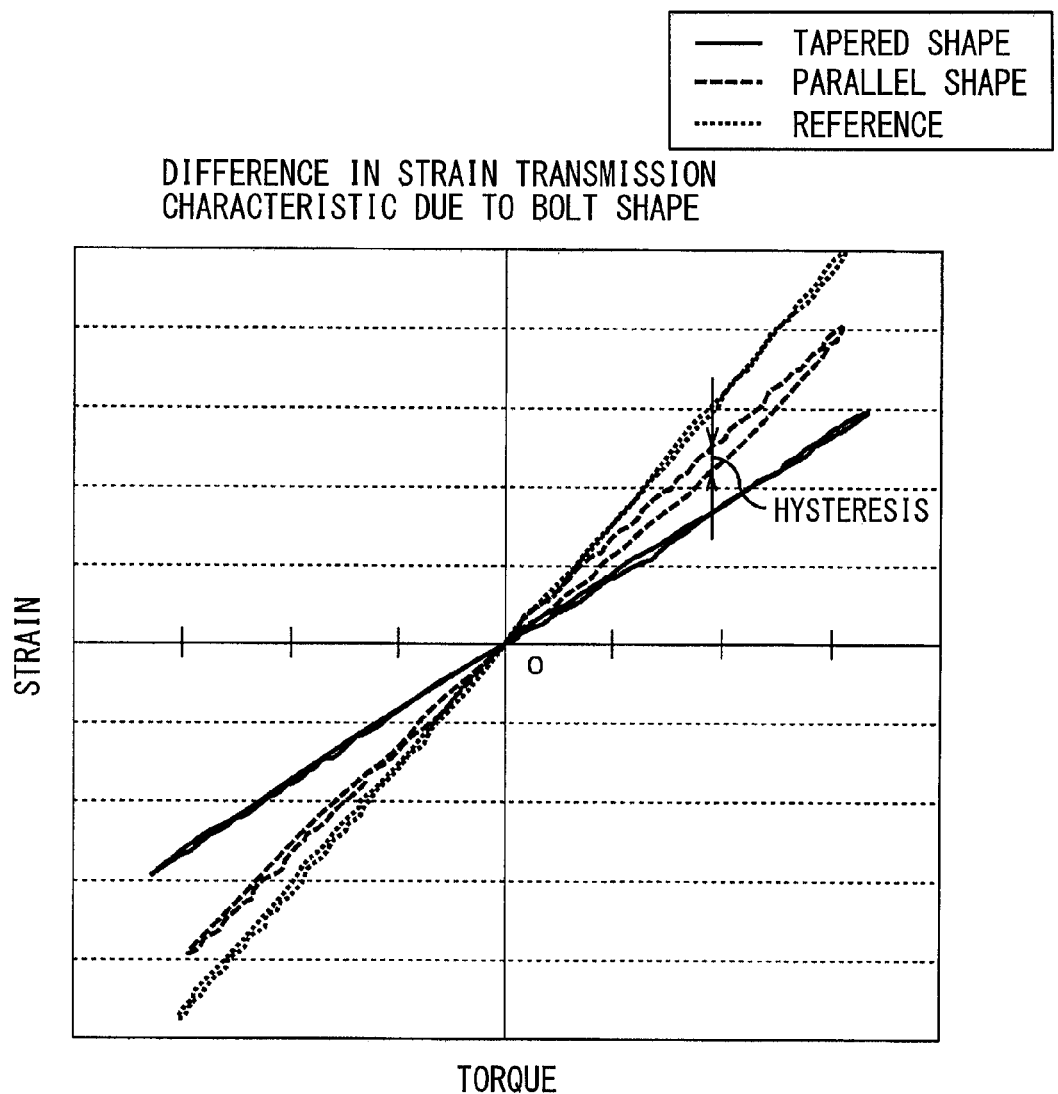
FIG. 15 is a diagram illustrating a relationship between a torque and a strain applied from the metal shaft according to a bolt shape in the sixth embodiment.

Specifically, the present inventors have examined, as differences of the strain transmission characteristics caused by the bolt shape, a relationship between a torque and a strain received from the metal shaft 10 by the bolt 70 having the parallel screw shape illustrated in FIG. 12, and a relationship between a torque and a strain received from the metal shaft 10 by the bolt 70 having the tapered shape illustrated in FIG. 14. The results are illustrated in FIG. 15. FIG. 15 also illustrates the strain of the flat surface 12 of the metal shaft 10 for reference.

As illustrated in FIG. 15, in the bolt 70 of the parallel screw shape, slip occurs in the frank portion of the screw when the metal shaft 10 is twisted, and hysteresis is generated in the amount of strain transmitted from the metal shaft 10 to the strain detection elements 40. On the other hand, in the case of the tapered bolt 70, since the hysteresis is not substantially generated, accurate torque measurement can be performed. In other words, with the tapered screw portion 72, since the frank portion is held by the wall surface 14 of the metal shaft 10, the hysteresis of the strain can be reduced.

The embedded member 76 such as anaerobic adhesive described in the fourth embodiment is coated on the screw portion 72, and then fastened to the metal shaft 10, thereby being capable of preventing the slip of the frank portion, and further reducing the hysteresis. As described above, since the screw portion 72 of the bolt 70 is tapered, the strain can be measured with high precision without generating the hysteresis of the strain.

(Seventh Embodiment)

In this embodiment, portions different from the fourth to sixth embodiments will be described. In the fourth to sixth embodiments, the height of the bottom 74 of the groove portion 73 provided in the head 71 of the bolt 70 is arranged at a position higher than the surface 11 of the metal shaft 10, which is an example. For example, the bolt 70 may be attached to the metal shaft 10 so that the surface 11 of the metal shaft 10 is at the same height as that of the bottom 74 of the groove portion 73. On the other hand, the bolt 70 may be fastened to the metal shaft 10 so that when a distance (that is, a diameter of the metal shaft 10) from a center axis of the metal shaft 10 to the surface 11 is defined as r, the height from the center axis of the metal shaft 10 to the bottom 74 of the groove portion 73 of the bolt 70 becomes equal to or larger than 0.5r, and equal to or smaller than 0.9r.

Figure 16:
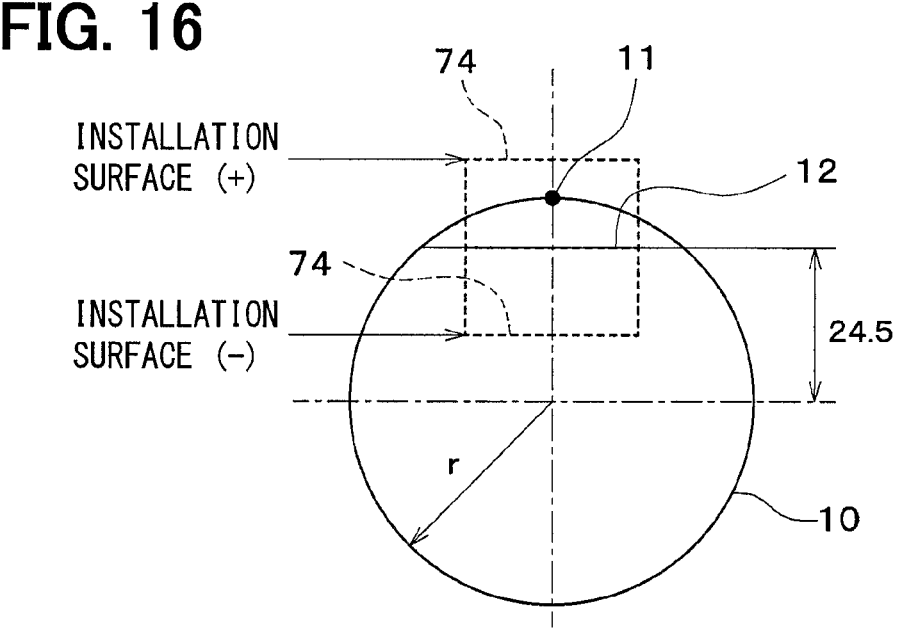
FIG. 16 is a diagram illustrating a distance from a surface of a metal shaft to a bottom (installation surface) thereof in a seventh embodiment.
Figure 17:
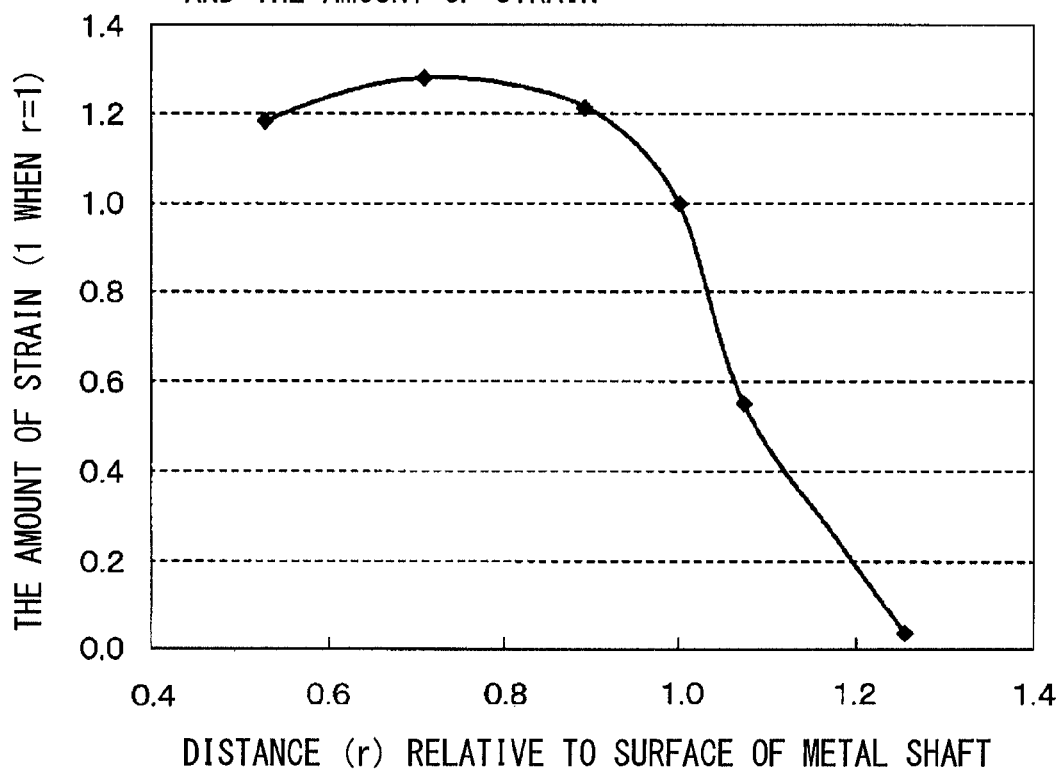
FIG. 17 is a diagram illustrating a relationship between an amount of strain and a distance from a surface of a metal shaft to a bottom (installation surface) thereof in the seventh embodiment.

Specifically, the present inventors have examined the amount of strain of the installation surface center when, as illustrated in FIG. 16, the flat surface 12 is set at a position of, for example, 24.5 mm from the center axis with respect to the metal shaft 10 of φ55, and the bottom 74 (installation surface) of φ20 from the flat surface 12 is provided at 0, ±5 mm, and ±10 mm. As a result, as illustrated in FIG. 17, it is found that the amount of strain becomes larger in a range of the radius r from 0.5 to 0.9. It is understood from the results that the height is preferably set to be equal to or larger than 0.5r, and equal to or smaller than 0.9r. As a result, since the amount of strain of the metal shaft 10 caused by the torque is improved, the detection precision of the strain can be improved. In a correspondence between the description of this embodiment and the claims, the bottom 74 corresponds to "installation surface" in the claims.

(Eighth Embodiment)

Figure 18:
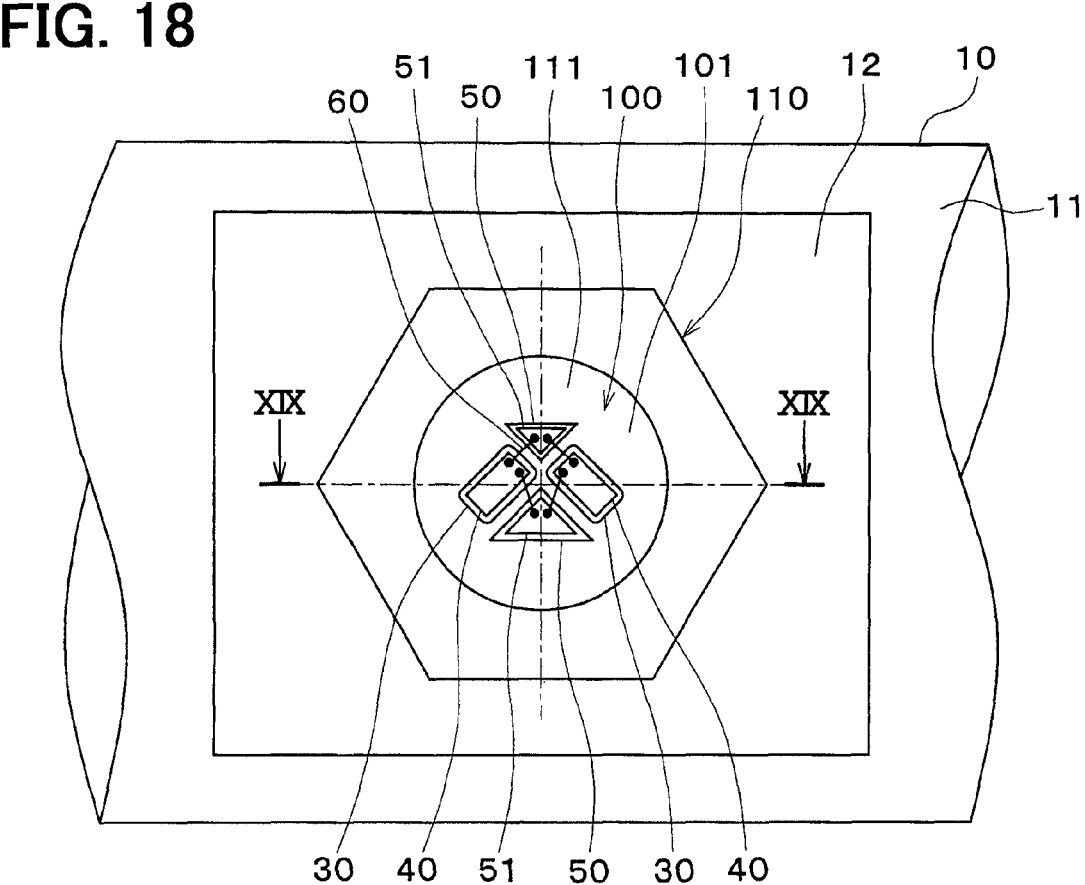
FIG. 18 is a plan view of a torque sensor according to an eighth embodiment of the present disclosure.

In this embodiment, portions different from the first to seventh embodiments will be described. As illustrated in FIG. 18, in this embodiment, a torque sensor includes a metal frame 100, a bolt 110, strain detection elements 40, and glass 30.

Figure 19:
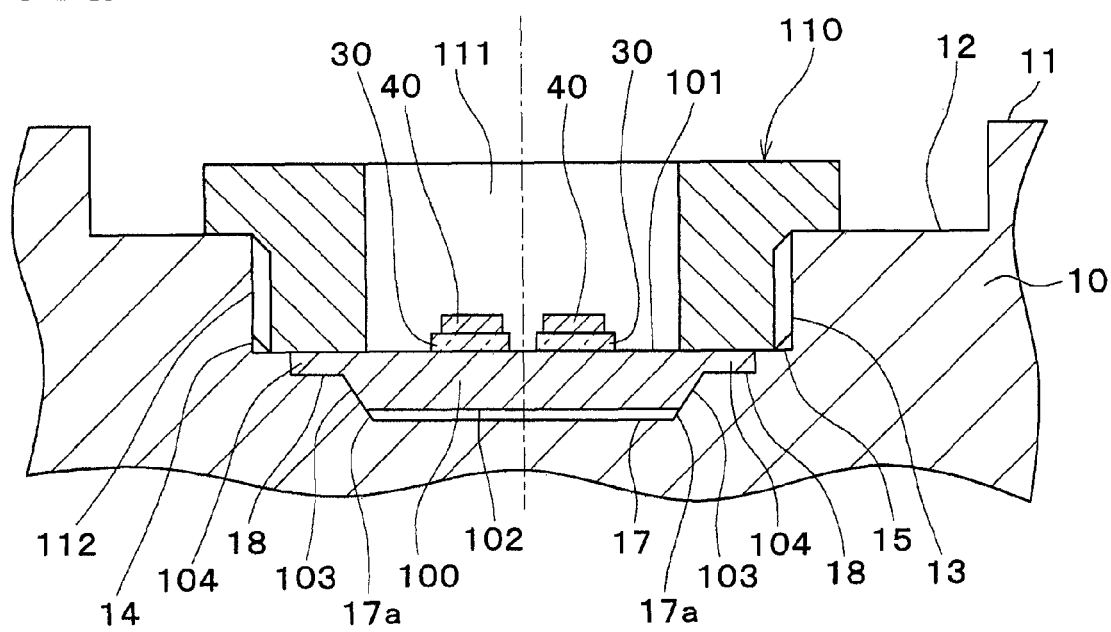
FIG. 19 is a cross-sectional view taken along a line XIX-XIX of FIG. 18.

As illustrated in FIG. 19, the metal frame 100 is formed in a plate shape having one surface 101, another surface 102 on the opposite side of the one surface 101, and a side surface 103 that comes in contact with the one surface 101 and the another surface 102. The side surface 103 is formed in a tapered shape to reduce the size of the another surface 102 from the one surface 101 toward the another surface 102.

Figure 20:
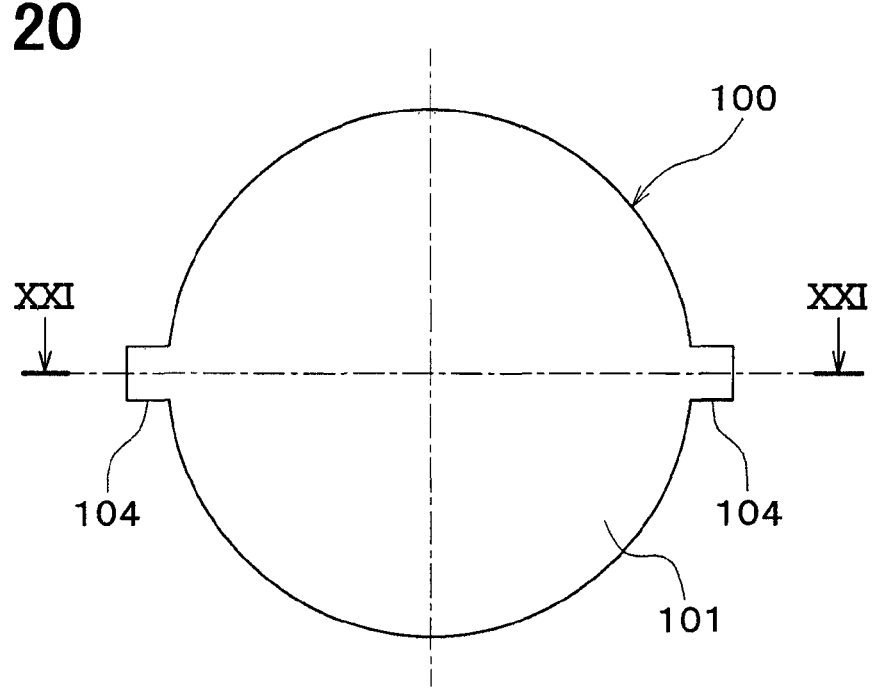
FIG. 20 is a plan view of one surface of a metal frame according to the eighth embodiment.

As illustrated in FIG. 20, a planar shape of the one surface 101 of the metal frame 100 is circular. In other words, the metal frame 100 is shaped in a disc. The metal frame 100 has detent portions 104 formed in the side surface 103. The detent portions 104 are portions in which a part of the side surface 103 protrudes in a radial direction of the metal frame 100. In this embodiment, the detent portions 104 are provided at two places.

The detent portions 104 function to prohibit the rotation of the metal frame 100 about the center axis of the bolt 110. The detent portions 104 function as positioning device for positioning the strain detection elements 40 in a direction of ±45° to a twist direction of the metal shaft 10.

Figure 21:
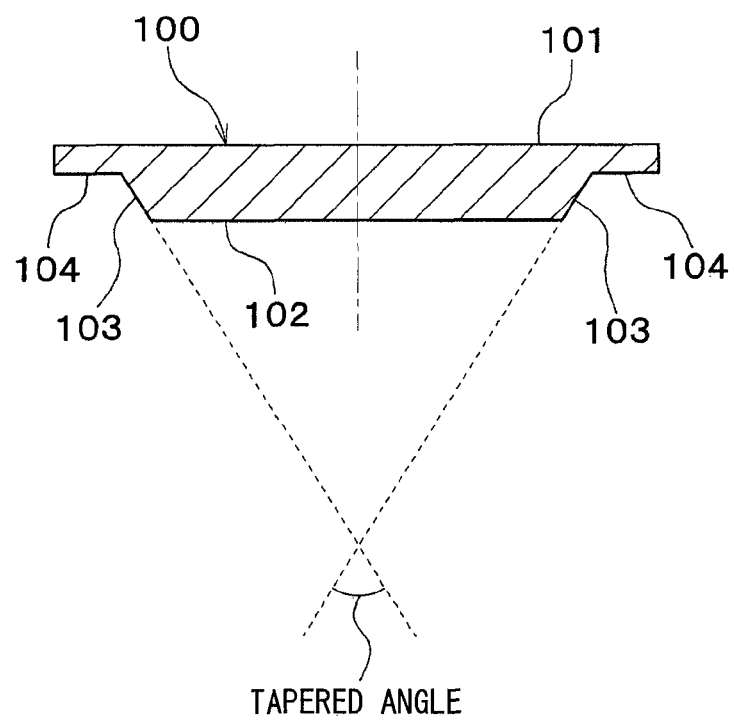
FIG. 21 is a cross-sectional view taken along a line XXI-XXI of FIG. 20.

As illustrated in FIG. 21, when an angle formed by respective straight lines parallel to one surface and another surface of the side surface 103 when a cross-section of the metal frame 100 is taken along a direction perpendicular to the one surface 101 is defined as a tapered angle. The side surface 103 is formed in a tapered shape so that the tapered angle becomes equal to or larger than 5° and equal to or smaller than 55°, that is, 30°±25°. Specifically, in this embodiment, the side surface 103 is formed so that the tapered angle becomes 45°.

The reason that a lower limit value of the tapered angle is set to 5° is because when the tapered angle is too small, a position of the metal frame 100 to a radial direction of the metal shaft 10 is not determined after the metal frame 100 has been attached to a recess 17. On the other hand, the reason that an upper limit value of the tapered angle is set to 55° is because when the tapered angle is too large, a slip occurs in the side surface 103, there making it difficult to transmit the strain from the metal shaft 10 to the metal frame 100, or increasing the hysteresis of the strain.

The bolt 110 is fastening device for fixing the metal frame 100 to the metal shaft 10 by being screwed to the depression 13 of the metal shaft 10. As illustrated in FIG. 19, the bolt 110 is shaped into a hollow cylinder having a hollow portion 111, and penetrates in an axial direction of the center axis. In the bolt 110, an external thread is formed in an outer wall surface 112. The bolt 110 is a so-called hexagon bolt.

Figure 22:
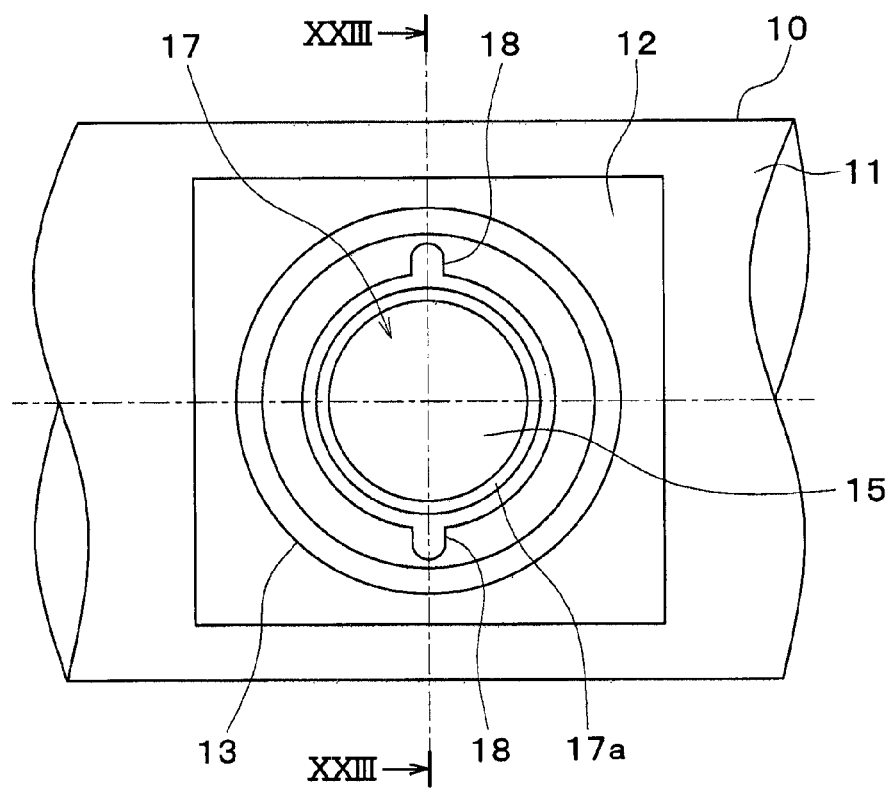
FIG. 22 is a plan view of a metal shaft according to the eighth embodiment.

On the other hand, as illustrated in FIG. 22, the metal shaft 10 has the above-mentioned depression 13, and the recess 17 in which a part of the bottom surface 15 of the depression 13 is recessed. The recess 17 has catch portions 18 in which the detent portions 104 of the metal frame 100 are arranged.

Figure 23:
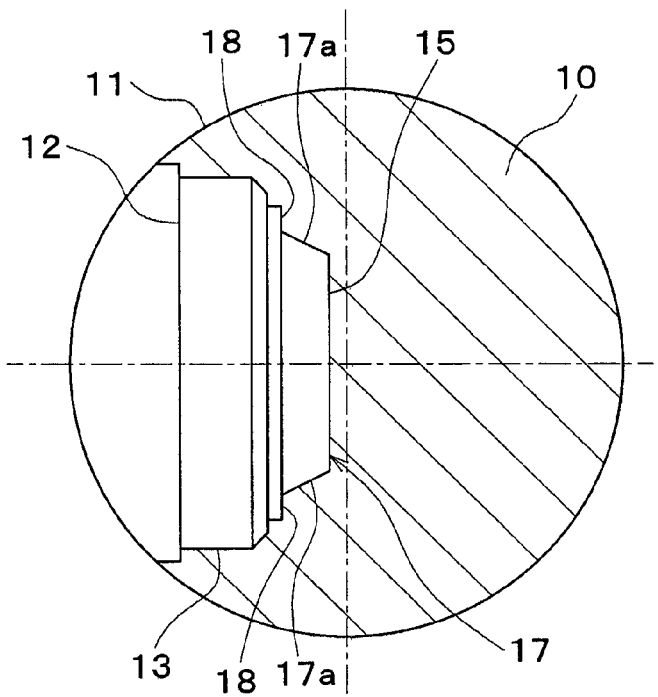
FIG. 23 is a cross-sectional view taken along a line XXIII-XXIII of FIG. 22.

As illustrated in FIG. 23, the recess 17 has a tapered surface 17a formed into a tapered shape so that a size of the recess 17 in a surface direction of the bottom surface 15 of the depression 13 is reduced toward a depth direction of the recess 17. The tapered surface 17a is formed with the same tapered angle as that of the side surface 103 of the metal frame 100. With the above configuration, no gap occurs between the tapered surface 17a of the recess 17 and the side surface 103 of the metal frame 100.

The metal frame 100 is fitted into the recess 17 so that the side surface 103 comes into contact with the tapered surface 17a of the recess 17, and the detent portions 104 are located at the catch portions 18 of the recess 17. The another surface 102 of the metal frame 100 comes out of contact with the bottom of the recess 17. Further, the bolt 110 is screwed into the depression 13. With the above configuration, the metal frame 100 is pushed toward the metal shaft 10 side, and also fixed to the metal shaft 10. In other words, the torque sensor has a structure detachably attached to the metal shaft 10.

In this example, the detent portions 104 of the metal frame 100 are caught by the catch portions 18 of the recess 17 in a state where the metal frame 100 is fitted into the recess 17. In other words, since the detent portions 104 of the metal frame 100 are caught by the catch portions 18 of the recess 17 in the metal shaft 10, the rotation of the metal frame 100 is prohibited. With the above configuration, the metal frame 100 can be prevented from rotating together with the bolt 110 at the time of fastening the bolt 110. The position of the metal frame 100 to the recess 17 can be fixed.

As illustrated in FIGS. 18 and 19, the strain detection elements 40 are fixed to portions corresponding to the hollow portion 111 of the bolt 110 in the one surface 101 of the metal frame 100 through the glass 30. Since the rotation of the metal frame 100 to the metal shaft 10 is prohibited by the detent portions 104, the strain detection elements 40 are fixed to the metal shaft 10 at predetermined positions. As a result, the strain detection elements 40 can appropriately detect the strain of the metal shaft 10.

Figure 24:
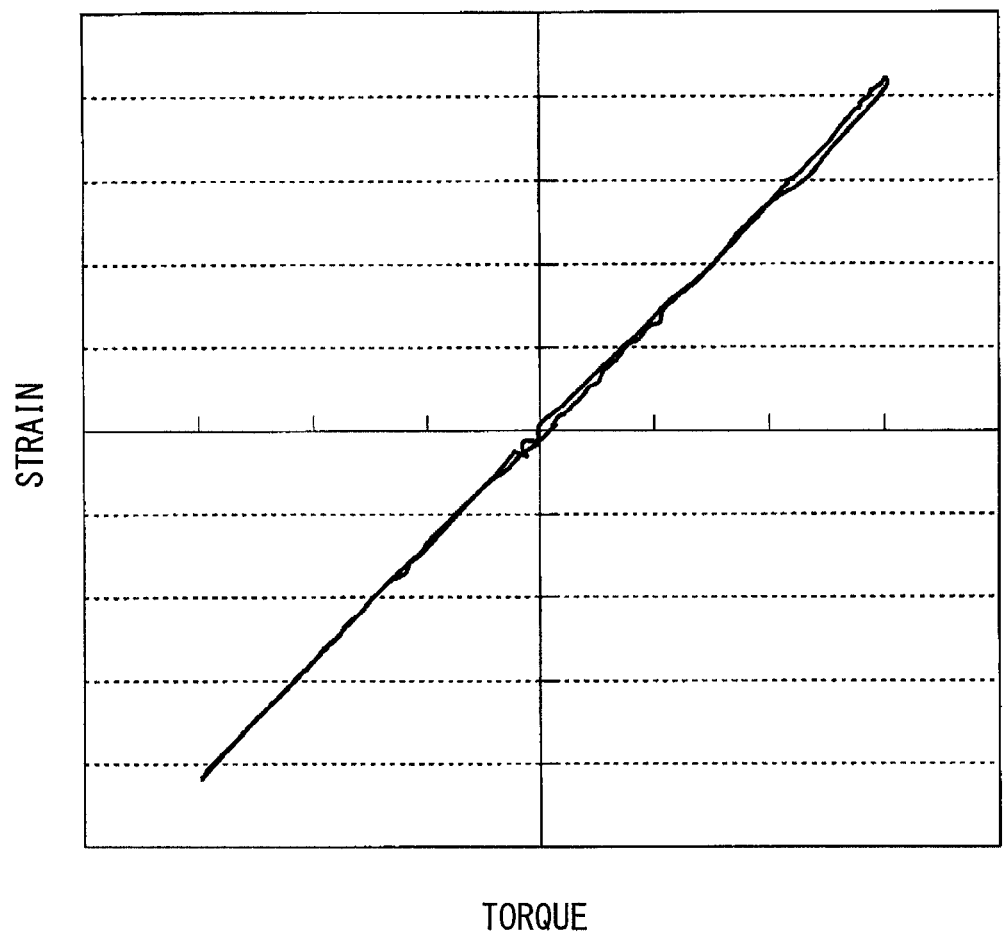
FIG. 24 is a diagram illustrating a relationship between a torque and a strain applied to the metal frame from the metal shaft according to the eighth embodiment.

The present inventors have examined a relationship between the torque and the strain received by the metal frame 100 from the metal shaft 10 when the fastening torque of the bolt 110 to the metal shaft 10 is set to, for example, 30 Nm. The results are illustrated in FIG. 24. As illustrated in FIG. 24, since no hysteresis is substantially generated in the amount of strain transmitted from the metal shaft 10 to the strain detection elements 40, the accurate torque measurement can be performed. In other words, even in a configuration where the metal frame 100 to which the strain detection elements 40 are fixed is separated from the bolt 110 for fixing the metal frame 100 to the metal shaft 10, the strain can be surely transmitted to the strain detection elements 40 through the metal frame 100. Therefore, the accurate strain of the metal shaft 10 can be detected.

In a correspondence between the description of this embodiment and the claims, the metal frame 100 and the bolt 110 correspond to "base portion" in the claims.

(Ninth Embodiment)

Figure 25A:
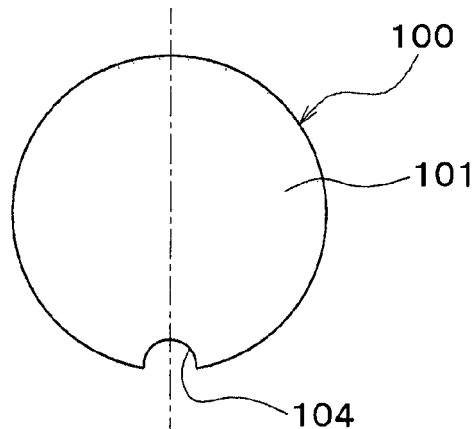
FIGS. 25A and 25B are a plan view and a side view of a metal frame according to a ninth embodiment of the present disclosure.
Figure 25B:
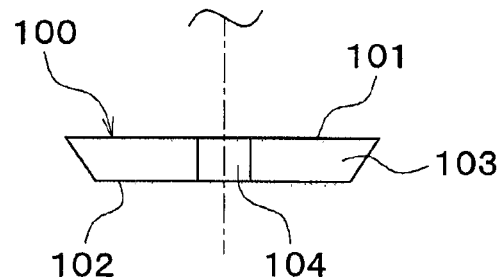

In this embodiment, portions different from the eighth embodiment will be described. In this embodiment, as illustrated in FIGS. 25A and 25B, the detent portions 104 are configured as a notch in which a part of an outer edge of the metal frame 100 is recessed toward a center axis side of the metal frame 100. FIGS. 25A and 25B illustrate a plan view of the metal frame 100 at an upper side and a side view of the metal frame 100 at a lower side, respectively. The same is applied to FIG. 26A to FIG. 28B described below.

On the other hand, the catch portions 18 of the metal shaft 10 are configured as knock pins not shown provided in the recess 17. With the above configuration, when the metal frame 100 is fitted into the recess 17, since the knock pins are inserted into the detent portions 104 of the metal frame 100, the detent portions 104 and the knock pins are caught by each other. Therefore, the rotation of the metal frame 100 can be prohibited.

(Tenth Embodiment)

Figure 26A:
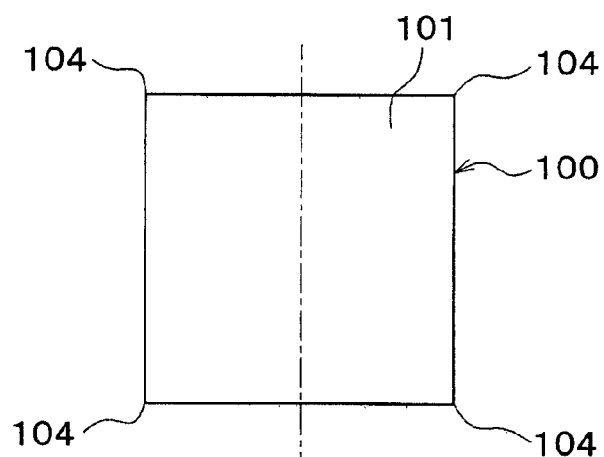
FIGS. 26A and 26B are a plan view and a side view of a metal frame according to a tenth embodiment of the present disclosure.
Figure 26B:
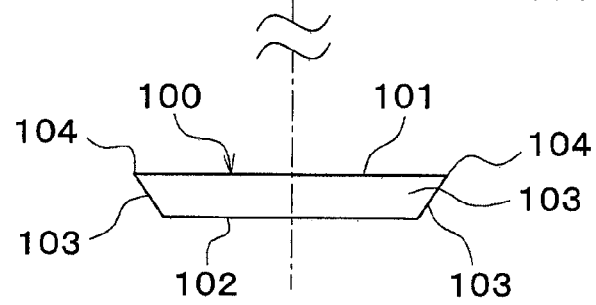

In this embodiment, portions different from the eighth and ninth embodiments will be described. In this embodiment, as illustrated in FIGS. 26A and 26B, the metal frame 100 has one surface 101 formed into a rectangular shape. In this case, four corners of the metal frame 100 serve as detent portions 104. Therefore, a recess 17 of the metal shaft 10 is also formed into a rectangular shape, and corners of the recess 17 serve as catch portions 18. With the above configuration, the corners of the metal frame 100 are caught by the corners of the recess 17, thereby being capable of prohibiting the rotation of the metal frame 100.

(Eleventh Embodiment)

Figure 27A:
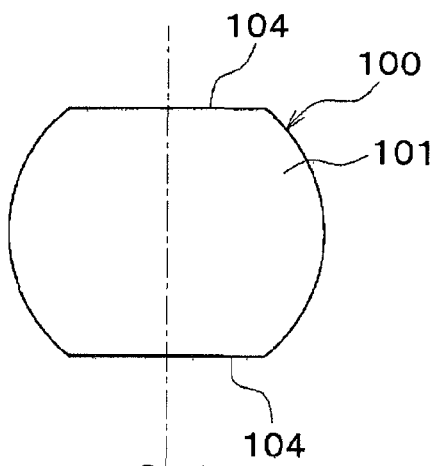
FIGS. 27A and 27B are a plan view and a side view of a metal frame according to an eleventh embodiment of the present disclosure.
Figure 27B:
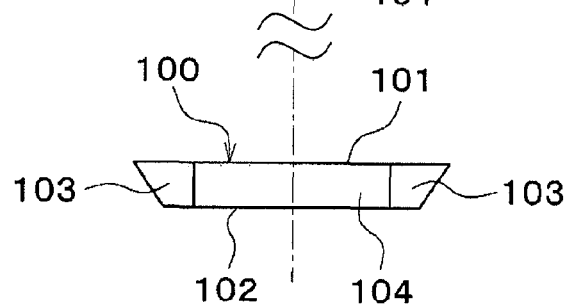

In this embodiment, portions different from the eighth to tenth embodiments will be described. In this embodiment, as illustrated in FIGS. 27A and 27B, the metal frame 100 is shaped so that two places of an outer edge are linearly cut off. With the above configuration, linear portions of one surface 101 in the metal frame 100 serve as detent portions 104.

On the other hand, a recess 17 of a metal shaft 10 is formed with the same planar shape as that of the one surface 101 of the metal frame 100. With the above configuration, the linear portions of the metal frame 100 are caught by the linear portions of the recess 17, thereby being capable of prohibiting the rotation of the metal frame 100.

(Twelfth Embodiment)

Figure 28A:
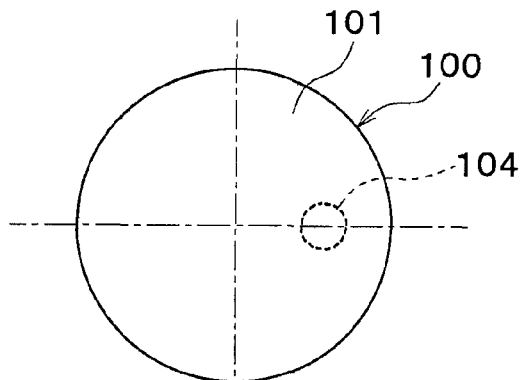
FIGS. 28A and 28B are a plan view and a side view of a metal frame according to a twelfth embodiment of the present disclosure.
Figure 28B:
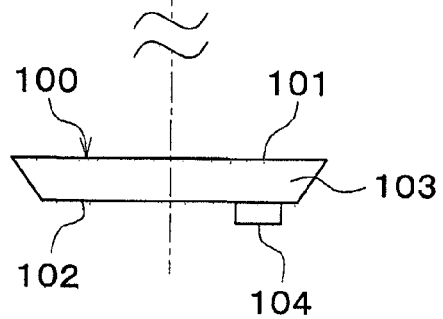

In this embodiment, portions different from the eighth to tenth embodiments will be described. In this embodiment, as illustrated in FIGS. 28A and 28B, a part of another surface 102 of a metal frame 100 protrudes cylindrically. The protruded portion serves as a detent portion 104. On the other hand, a recess 17 of a metal shaft 10 has a hole not shown into which the detent portion 104 is inserted as a catch portion 18 in the bottom.

Therefore, when the metal frame 100 is fitted into the recess 17, the protruded portion which is the detent portion 104 is inserted into the hole of the recess 17. This configuration can prohibit the rotation of the metal frame 100.

(Thirteenth Embodiment)

Figure 29:
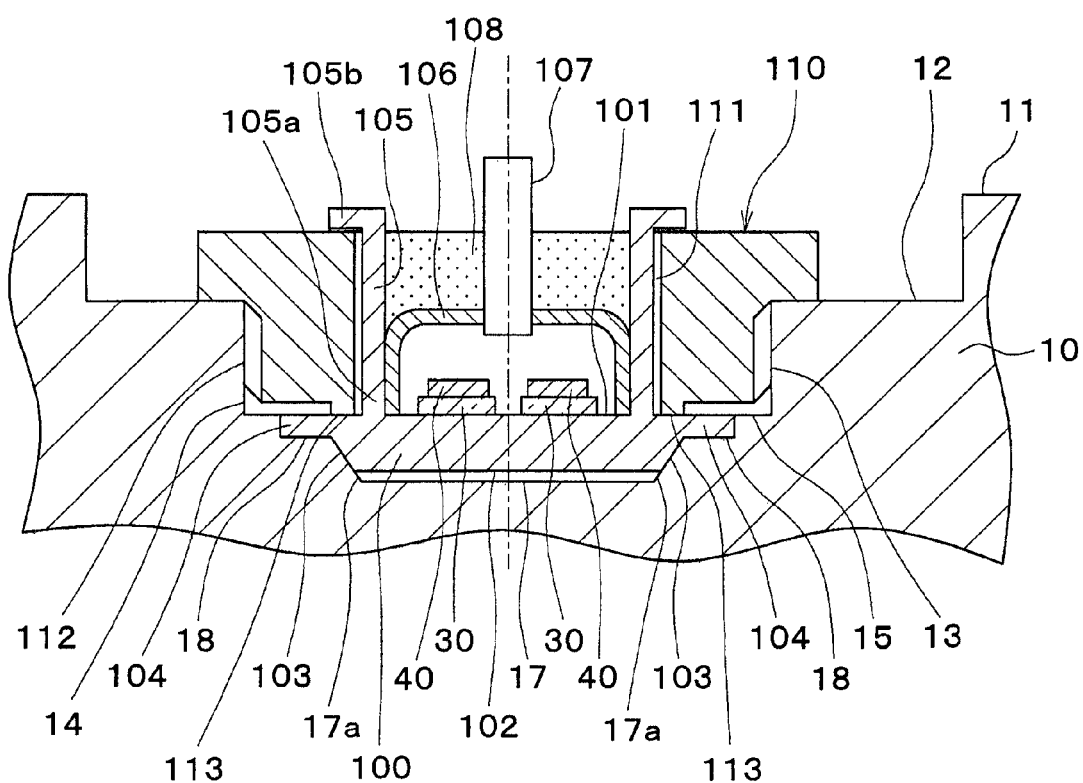
FIG. 29 is a plan view of a torque sensor according to a thirteenth embodiment of the present disclosure.

In this embodiment, portions different from the eighth to twelfth embodiments will be described. As illustrated in FIG. 29, the metal frame 100 includes a cylindrical portion 105, a cap 106, an extraction portion 107, and a potting material 108.

The cylindrical portion 105 is a part that is shaped into a hollow cylinder, and has one end 105a fixed to a one surface 101. Strain detection elements 40 are arranged in a hollow portion of the cylindrical portion 105. The cap 106 is an umbrella-shaped part that is arranged in a hollow portion of the cylindrical portion 105, and covers the strain detection element 40. In other words, the cap 106 is a cap part for housing the strain detection elements 40 in the hollow portion of the cylindrical portion 105.

The extraction portion 107 is a part that is disposed in the cap 106, for extracting lines from the printed boards 50 to an external. In other words, the extraction portion 107 is formed as a connector for extracting detection signals of the strain detection elements 40 to the external. The bonding material 108 is a part that is arranged in the hollow portion of the cylindrical portion 105, and covers the cap 106 to fix the cap 106 to the metal frame 100.

On the other hand, in the bolt 110, the cylindrical portion 105 of the metal frame 100 is inserted into the hollow portion 111. The bolt 110 is integrated with the metal frame 100 in such a manner that the other end 105b on the opposite side of one end 105a in the cylindrical portion 105 is caught by the bolt 110. The other end 105b of the cylindrical portion 105 is swaged to, for example, the bolt 110.

With the above configuration, since the torque sensor does not fall apart for each part, but is integrated into one, the transport of the torque sensor can be facilitated. Since the torque sensor may be screwed to the depression 13 of the metal shaft 10 to be measured, and a wiring connector may be connected to the extraction portion 107, an assembling workability can be improved.

Further, the bolt 110 has a ring-shaped end surface 113 that pushes a portion corresponding to the tapered surface 17a in the one surface 101 of the metal frame 100 toward the metal shaft 10 side. Therefore, the bolt 110 intensively pushes a portion corresponding to the tapered surface 17a of the one surface 101 of the metal frame 100 toward the metal shaft 10 by the ring-shaped end surface 113. With the above configuration, the deformation of the metal frame 100 can be suppressed. Since the deformation of the metal frame 100 is suppressed, the strain detection elements 40 can be prevented from peeling off from the metal frame 100, and the strain can be surely transmitted from the metal shaft 10 to the metal frame 100.

As described above, with the provision of the cylindrical portion 105 in the metal frame 100, a structure in which the metal frame 100 and the bolt 110 are integrated together in advance can be realized.

(Fourteenth Embodiment)

Figure 30:
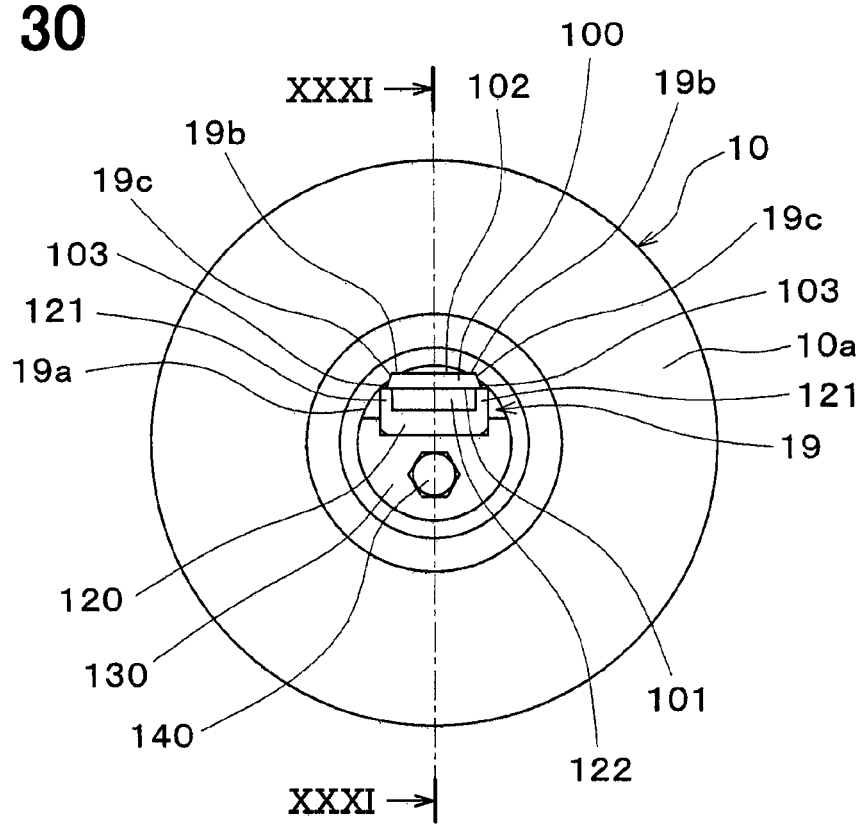
FIG. 30 is a plan view of an end surface of one end of a metal shaft according to a fourteenth embodiment of the present disclosure.
Figure 31:
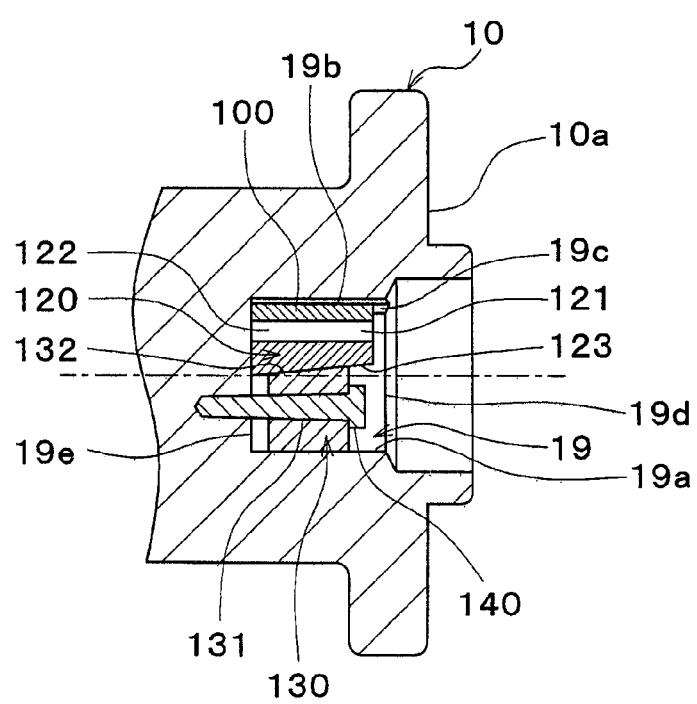
FIG. 31 is a cross-sectional view taken along a line XXXI-XXXI of FIG. 30.

In this embodiment, portions different from the respective embodiments will be described. As illustrated in FIGS. 30 and 31, a metal shaft 10 has one end 10a, and a hole 19 in which a part of an end surface of the one end 10a is recessed along a center axis of the metal shaft 10. The hole 19 is defined in the center axis of the metal shaft 10. A planar shape of the hole 19 in a direction perpendicular to the center axis of the metal shaft 10 is circular.

The metal shaft 10 according to this embodiment is configured as a crank shaft configuring a part of an engine of an automobile. In other words, the one end 10a of the metal shaft 10 corresponds to a rear side of the automobile in the crank shaft. The hole 19 corresponds to a center hole defined in a rear side end surface of the crank shaft.

As illustrated in FIG. 30, the hole 19 has a recess 19b in which a part of an inner wall surface 19a is recessed toward an outer diameter side of the metal shaft 10, in the inner wall surface 19a parallel to the center axis of the metal shaft 10 in the hole 19. The recess 19b has a pair of tapered surfaces 19c that is tapered to reduce a size of the recess 19b toward a depth direction of the recess 19b. The above recess 19b is a portion into which the metal frame 100 is fitted. The recess 19b is a part of the inner wall surface 19a of the hole 19.

As illustrated in FIGS. 30 to 32B, the torque sensor according to this embodiment includes the metal frame 100, glass 30, strain detection elements 40, a printed board 52, a first block 120, a second block 130, and a bolt 140. In FIGS. 30 and 31, the glass 30 and the strain detection elements 40 are omitted.

Figure 32A:
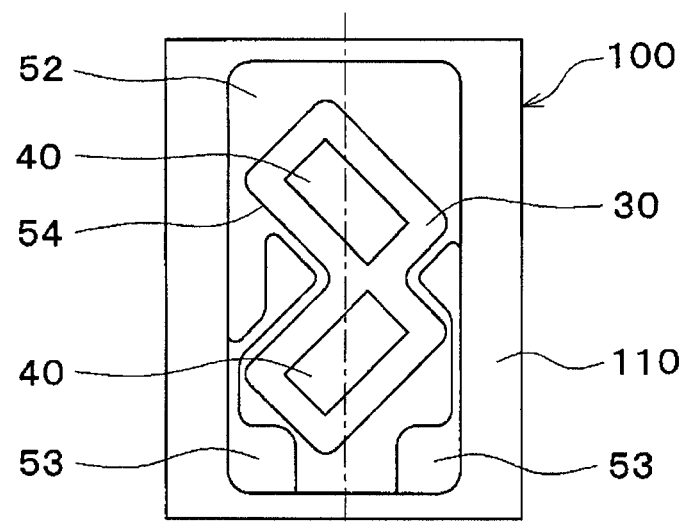
FIGS. 32A and 32B are a plan view and a side view of a metal frame according to the fourteenth embodiment of the present disclosure.
Figure 32B:
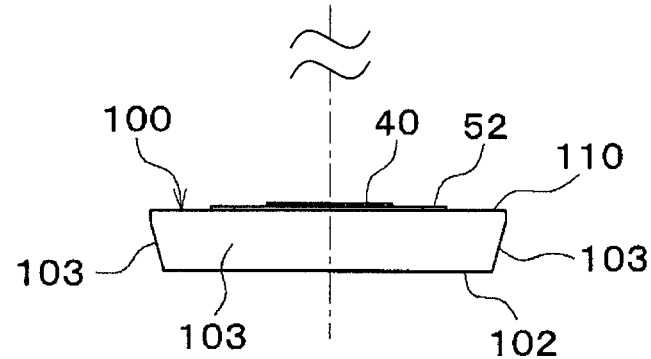

As illustrated at an upper side of FIGS. 32A and 32B, the metal frame 100 has one surface 101 formed into a rectangular shape. As illustrated at a lower side of FIGS. 32A and 32B, the metal frame 100 has one pair of side surfaces 103 that is tapered to reduce a size of the another surface 102 from the one surface 101 toward the another surface 102. Another pair of side surfaces adjacent to the pair of side surfaces 103 may be tapered, or may not be tapered.

As illustrated in FIG. 30, the metal frame 100 is arranged in the hole 19 so as to come in contact with the inner wall surface 19a of the hole 19 of the metal shaft 10. Specifically, the metal frame 100 is fitted into the recess 19b so that at least a part of the another surface 102, that is, the pair of side surfaces 103 comes into contact with the pair of tapered surfaces 19c provided in the recess 19b of the hole 19.

As illustrated at an upper side of FIGS. 32A and 32B, the printed board 52 is fixed to the one surface 101 of the metal frame 100 by adhesive. The printed board 52 includes wiring patterns 53 for electrically connecting the strain detection elements 40 to the external, and a groove 54 in which the strain detection elements 40 are arranged. The strain detection elements 40 are fixed to the one surface 101 of the metal frame 100 through the glass 30 arranged in the groove 54 of the printed board 52.

As illustrated in FIG. 30, the first block 120 is a semi-cylindrical part, and arranged in the hole 19 of the metal shaft 10. The first block 120 is U-shaped in a cross-section in a direction perpendicular to the center axis of the metal shaft 10. In other words, the first block 120 has a pair of protrusions 121 protruding from a plate portion configuring the first block 120. A space 122 is defined between the pair of protrusions 121 in the first block 120. The strain detection elements 40 are housed in the space 122. The wiring patterns 53 are electrically connected to an external device through the space 122.

As illustrated in FIG. 31, the first block 120 has a first inclined surface 123 provided on the opposite side of the pair of protrusions 121 in the first block 120. The first inclined surface 123 is tapered, and inclined so that an opening portion 19d side of the hole 19 of the metal shaft 10 in the first inclined surface 123 is located on the inner wall surface 19a side than a bottom 19e side of the hole 19.

The above first block 120 functions to push the metal frame 100 toward the inner wall surface 19a of the hole 19 while the pair of protrusions 121 comes in contact with the one surface 101 of the metal frame 100. It is preferable that the pair of protrusions 121 pushes portions corresponding to the pair of tapered side surfaces 103 in the one surface 101 of the metal frame 100.

The second block 130 is a part that is arranged in the hole 19 of the metal shaft 10 for pushing the first block 120 toward the metal frame 100 side. The second block 130 includes a screw hole 131 and a second inclined surface 132.

The screw hole 131 is a through-hole through which a part of the second block 130 penetrates along the center axis of the metal shaft 10. The bolt 140 is inserted into the screw hole 131.

The second inclined surface 132 is provided in a portion that comes in contact with the first block 120 in the second block 130. The second inclined surface 132 is tapered, and inclined so that the opening portion 19d side of the hole 19 in the second inclined surface 132 is located at the inner wall surface 19a side than the bottom 19e side of the hole 19 as with the first inclined surface 123. The second block 130 is arranged in the hole 19 so that the second inclined surface 132 comes into contact with the first inclined surface 123 of the first block 120.

In this embodiment, the second block 130 is formed into such a semi-cylindrical shape that a portion on the opposite side of the first block 120 in the second block comes into contact with the inner wall surface 19a of the hole 19.

The bolt 140 is fastening device that is inserted into the screw hole 131 of the second block 130, and screwed to the bottom 19e of the hole 19. The bolt 140 is a hexagon bolt having a screw portion in a leading end portion.

The first block 120, the second block 130, and the bolt 140 function as pushing device for pushing the metal frame 100 toward the inner wall surface 19*a* of the hole 19. Specifically, the bolt 140 is fastened whereby the second block 130 moves to the bottom 19*e* side of the hole 19. As a result, since the second inclined surface 132 of the second block 130 slides on the first inclined surface 123, the second inclined surface 132 two-dimensionally pushes the first inclined surface 123 toward the metal frame 100 side. Therefore, the second block 130 fixes the metal frame 100 to the hole 19 of the metal shaft 10 through the first block 120. Since the bolt 140 has only to be screwed, the assembling work of the metal frame 100 is facilitated. With the above configuration, the strain detection elements 40 can detect the strain of the metal shaft 10 through the metal frame 100.

Figure 33:
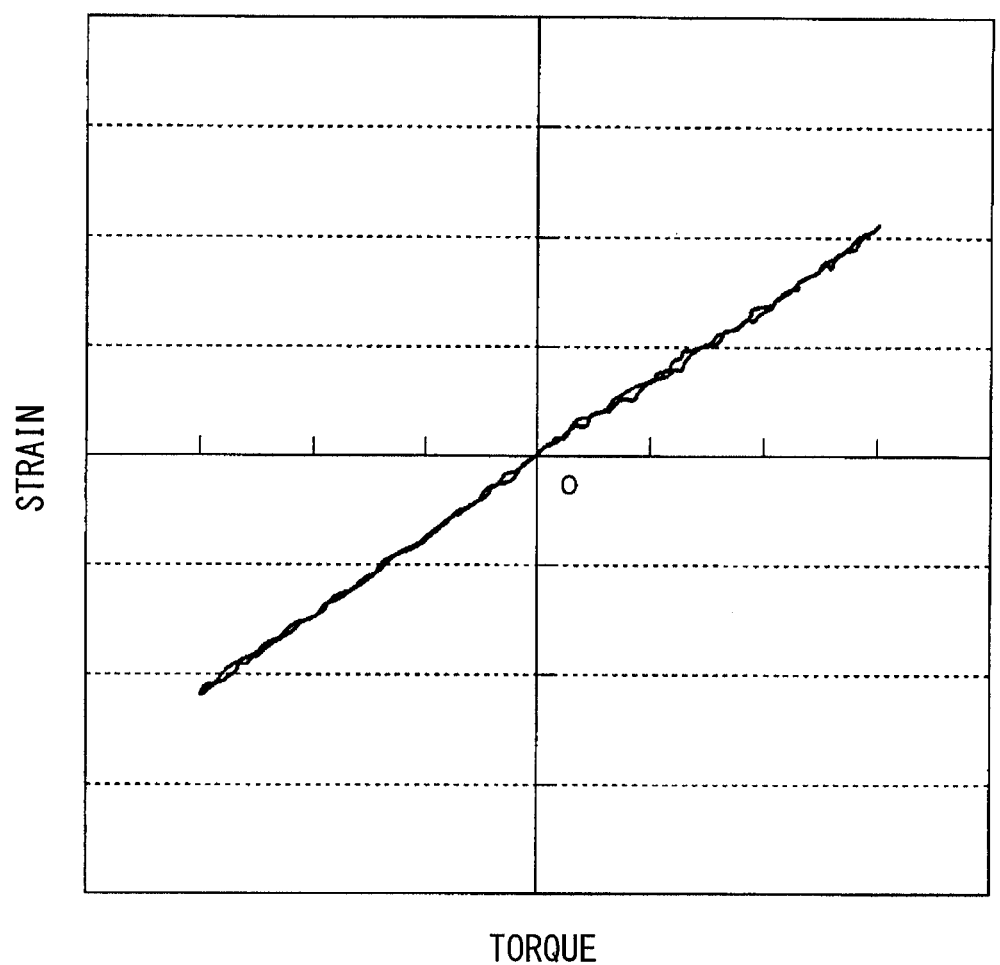
FIG. 33 is a diagram illustrating a relationship between a torque and a strain applied to the metal frame from the metal shaft according to the fourteenth embodiment.

The present inventors have examined a relationship between the torque and the strain received by the metal frame 100 from the metal shaft 10 when the second block 130 is fastened with the bolt 140 of, for example, M4 by the fastening torque of 4 Nm. The results are illustrated in FIG. 33. As illustrated in FIG. 33, the hysteresis is not substantially generated in the amount of strain detected by the strain detection elements 40. Therefore, as in this embodiment, even when the metal frame 100 is fixed to the hole 19 of the metal shaft 10, the accurate torque measurement of the metal shaft 10 can be performed.

The torque sensor is installed in the hole 19 of the metal shaft 10 which is a crank shaft for an automobile as described above, thereby being capable of detecting the strain even in a situation that makes it difficult to ensure the installation space of the torque sensor in the surface of the crank shaft. In other words, the space of the center hole of the crank shaft can be effectively used.

In a correspondence between the description of this embodiment and the claims, the first block 120, the second block 130 and the bolt 140 correspond to "pushing device" in the claims.

(Fifteenth Embodiment)

Figure 34:
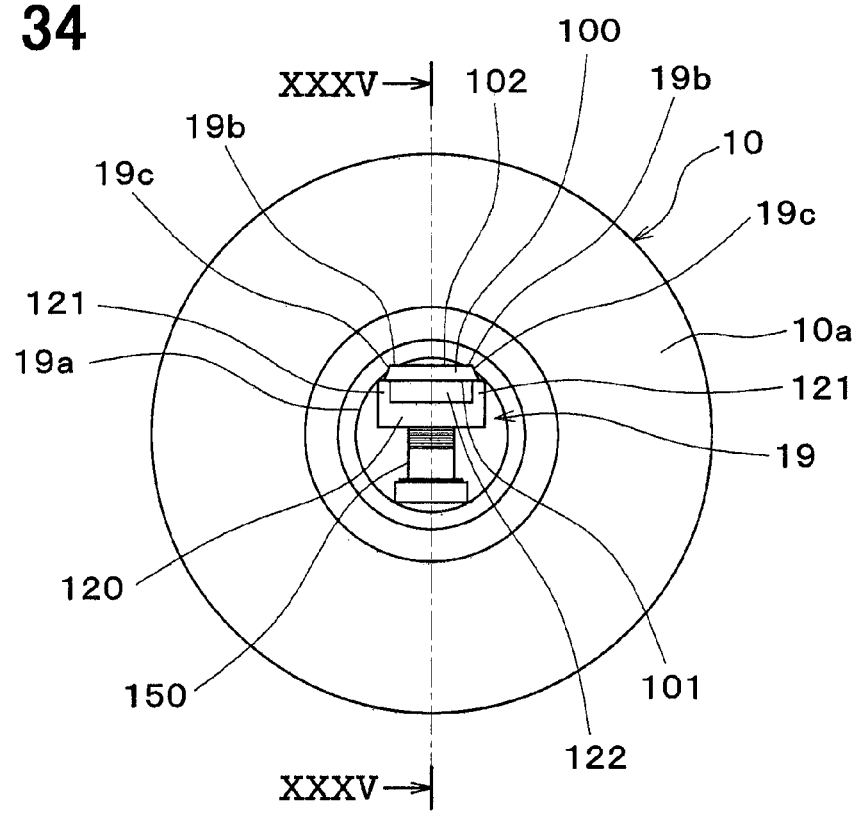
FIG. 34 is a plan view of an end surface of one end of a metal shaft according to a fifteenth embodiment of the present disclosure.
Figure 35:
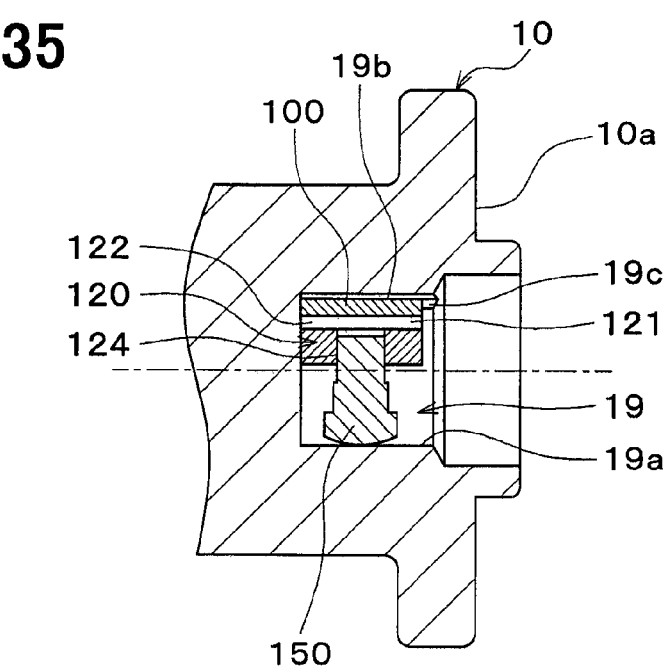
FIG. 35 is a cross-sectional view taken along a line XXXV-XXXV of FIG. 34.

In this embodiment, portions different from the fourteenth embodiment will be described. As illustrated in FIGS. 34 and 35, the torque sensor according to this embodiment includes a metal frame 100, glass 30, strain detection elements 40, a printed board 52, a first block 120, and a bolt 150.

The structures of the metal shaft 10, the metal frame 100, the glass 30, the strain detection elements 40, and the printed board 52 are identical with those in the fourteenth embodiment. In FIGS. 34 and 35, the glass 30 and the strain detection elements 40 are omitted.

As illustrated in FIG. 35, the first block 120 has a screw hole 124. The screw hole 124 is provided on the opposite side of the pair of protrusions 121 in the first block 120. Incidentally, in FIG. 35, the screw hole 124 penetrates through the first block 120, but the screw hole 124 may not penetrate through the first block 120.

The bolt 150 is fastening device that is arranged between the first block 120 and the inner wall surface 19*a* in the hole 19, and screwed into the screw hole 124 of the first block 120. A longitudinal direction of the bolt 150 is oriented in a direction perpendicular to the center axis of the metal shaft 10. A head of the bolt 150 comes into contact with the inner wall surface 19*a* of the hole 19. In order to prevent the head of the bolt 150 from being caught by the inner wall surface 19*a* at the time of fastening the bolt 150, it is preferable that the head of the bolt 150 is spherical. With this configuration, the head of the bolt 150 easily slides on the inner wall surface 19*a*.

In this embodiment, the first block 120 and the bolt 150 described above function as pushing device for pushing the metal frame 100 toward the inner wall surface 19*a* of the hole 19. Specifically, the bolt 150 is fastened to the first bolt 120, whereby the first block 120 moves to the bottom 19*e* side of the hole 19. With the above operation, the pair of protrusions 121 of the first block 120 pushes the metal frame 100 toward the metal shaft 10 side. Since the bolt 150 has only to be screwed, the assembling work of the metal frame 100 is facilitated. As described above, the metal frame 100 can be fixed to the metal shaft 10.

In a correspondence between the description of this embodiment and the claims, the first block 120 and the bolt 150 correspond to "pushing device" in the claims.

(Other Embodiments)

The configurations of the torque sensors described in the above respective embodiments are examples, and can be replaced with other configurations that can realize the present disclosure without being limited to the configurations described above. For example, the torque sensor is used for the vehicle, but the vehicle is an example of usage, and also used for something other than the vehicle.

The configuration of the strain detection elements 40 of the SAW type illustrated in FIGS. 3 and 4 is an example, and may be replaced with other configurations. Further, the arrangement of the printed boards 50 disposed on the metal frame 20, and the configuration providing the bonding wires 60 are examples, and device for extracting the signal of the strain detection elements 40 to the external may be appropriately set.

In the above respective embodiments, the metal frame 20 is welded to the metal shaft 10 by laser, which is device for joining and fixing the metal frame 20 to the metal shaft 10. Therefore, the metal frame 20 may be joined and fixed to the metal shaft 10 by a method other than laser welding.

In the first embodiment, the outer edge 24 of the another surface 22 of the metal frame 20 is circumferentially welded to the metal shaft 10 by laser, which is an example of the joining method. For example, the overall another surface 22 of the metal frame 20 may be joined to the flat surface 12 of the metal shaft 10. In the second and third embodiments, the entire side surface 23 and the entire another surface 22 of the metal frame 20 may be joined to the wall surface 14 and the bottom surface 15 of the depression 13. The entire side surface 23 of the metal frame 20 and the outer edge 24 of the another surface 22 may be joined to the depression 13.

In the second embodiment, the depth of the depression 13 of the flat surface 12 of the metal shaft 10 is the same as the thickness of the metal frame 20, which is an example of the shape. Therefore, the depth of the depression 13 may be thicker than the thickness of the metal frame 20. Conversely, the thickness of the metal frame 20 may be thicker than the depth of the depression 13.

In the metal frame 20 fitted into the depression 13, the another surface 22 of the metal frame 20 does not need to come into contact with the bottom surface 15 of the depression 13. In other words, the another surface 22 of the metal frame 20 may be spaced from the bottom surface 15 of the depression 13. At least the side surface 23 of the metal frame 20 may be integrated with the wall surface 14 of the depression 13.

In the third embodiment, all of the planar shapes of the flat surface 12, the depression 13, and the metal frame 20 are circular, but the planar shape of the flat surface 12 may be rectangular, and the planar shapes of the one surface 21 and the another surface 22 of the metal frame 20 may be circular. Likewise, the planar shape of the flat surface 12 may be rectangular, and the planar shapes of the depression 13 and the one surface 21 and the another surface 22 of the metal frame 20 may be circular. Conversely, the planar shapes of the metal frame 20 and the depression 13 may be rectangular, and the planar shape of the flat surface 12 of the metal shaft 10 may be circular. The planar shapes may be not only rectangular or circular but also polygonal. In this way, the planar shapes can be appropriately selected.

In the fourth to seventh embodiments, the configuration in which the groove portion 73 is provided in the head 71 of the bolt 70 is described. This is an example of the configuration of the bolt 70, and the groove portion 73 may not be provided in the head 71. For example, the strain detection elements 40 may be fixed to the surface of the head 71 with the glass 30.

In the fourth to seventh embodiments, the anaerobic adhesive is used as the embedded member 76 embedded between the screw portion 72 of the bolt 70 and the metal shaft 10. This is an example of the embedded member 76. Therefore, another member that is embedded in the gap between the screws may be used without being limited to the adhesive. When the thread of the bolt 70 and the thread of the metal shaft 10 hardly slide on each other, the embedded member 76 may not be provided.

The respective marks 16 and 75 described in the fourth embodiment may be applied to the metal shaft 10 and the bolt 70 in the fifth to seventh embodiments. When the strain detection elements 40 can be positioned even if the respective marks 16 and 75 are not provided, the respective marks 16 and 75 are unnecessary. The washer 90 described in the fifth embodiment may be applied to the bolt 70 described in the sixth and seventh embodiments.

In the fourth to seventh embodiments, the metal shaft 10 is included in the torque sensor. This is an example of the configuration of the torque sensor. In other words, in the fourth to seventh embodiments, the torque sensor may include the bolt 70, the glass 30, the strain detection elements 40, and the printed boards 50.

In the eighth to thirteenth embodiments, in order to prohibit the rotation of the metal frame 100, the detent portions 104 are provided on the metal frame 100. They are an example of the detent portions 104. When the metal frame 100 does not rotate with respect to the metal shaft 10, the detent portions 104 of the metal frame 100 may not be provided.

In the eighth to thirteenth embodiments, the bolt 110 is configured as the hexagon bolt. This is an example of the shape of the bolt 110. Therefore, the bolt 110 may be formed into another shape that can screw the metal shaft 10.

In the fourth to thirteenth embodiments, the strain detection elements 40 are fixed to the bolt 70 or the metal frame 100 through the glass 30. The glass 30 is an example of the fixing device. In the fourth to thirteenth embodiments, the bolt 70 and the metal frame 100 are not affected by heat when being fixed to the metal shaft 10 as in the first embodiment. Therefore, the strain detection elements 40 may be fixed to the bolt 70 or the metal frame 100 with the adhesive. Likewise, in the fourteenth and fifteenth embodiments, the strain detection elements 40 may be fixed to the metal frame 100 with the adhesive. In a correspondence between the description of this embodiment and the claims, the adhesive corresponds to "fixing portion" in the claims.

In the fourth to thirteenth embodiments, the bolt 70 and the metal frame 100 are fixed to the metal shaft 10 having the flat surface 12, but the bolt 70 and the metal frame 100 may be fixed to the metal shaft 10 having no flat surface 12. For example, the depression 13 may be formed in the surface 11 of the metal shaft 10, and the bolt 70 may be fastened directly to the depression 13. Likewise, the metal frame 100 may be fitted into the recess 17 provided in the depression 13, and the bolt 110 may be fastened directly to the depression 13.

In the thirteenth embodiment, the end surface 113 of the bolt 110 is formed in a ring shape so as to correspond to the tapered surface 17a of the metal frame 100. This is an example of the shape of the end surface 113. For example, the end surface 113 may be formed with the inclusion of a portion corresponding to the tapered surface 17a of the metal frame 100. The end surface 113 of the bolt 110 described in the thirteenth embodiment may be applied to the eighth to twelfth embodiments.

In the fourteenth and fifteenth embodiments, the one surface 101 of the metal frame 100 is rectangular. This is an example of the planar shape, and may be circularly shaped as described above. In that case, the recess 19b of the hole 19 is formed according to the planar shape of the metal frame 100. If the first block 120 has the two protrusions 121, the first block 120 is not U-shaped, but is formed into another shape. Further, the metal shaft 10 is not limited to the crank shaft of an automobile, but may be applied to another shaft.

In the fourteenth embodiment, the second block 130 is shaped so that the opposite side of the first block 120 in the second block 130 comes into contact with the inner wall surface 19a of the hole 19. This is an example of the shape of the second block 130. Therefore, the second block 130 is formed into another shape having the second inclined surface 132.

The fifteenth embodiment has the pushing structure in which the head of the bolt 150 comes into contact with the inner wall surface 19a of the hole 19. For example, a third block may be provided on the opposite side of the first block 120 in the bolt 150. In that case, the bolt 150 has screw portions on both ends thereof, and is screwed to the first block 120 and the third block. The bolt 150 is screwed so that the first block 120 moves to the metal frame 100 side, and the third block is pushed toward the inner wall surface 19a of the hole 19. With the above configuration, the opposite side of the first block 120 in the bolt 150 can be stabilized by the third block.

In the first to fifteenth embodiments, the oscillation frequency method is used as the detection system of the strain detection elements 40. The same effects can be obtained even when a phase contrast method is used.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:
1. A torque sensor comprising:
   a metal shaft having a rod shape as a measurement object of strain that is fixed to a base portion;
   a strain detection element of a surface acoustic wave type which is arranged in the base portion, and detects the strain of the metal shaft through the base portion;

a fixing portion that is arranged between the base portion and the strain detection element, and fixes the strain detection element to the base portion;

wherein the metal shaft has one end and a hole portion, which is prepared by recessing a part of the one end along a center axis of the metal shaft, wherein the base portion includes:
- a metal frame having a plate shape that has one surface and another surface, which is disposed on an opposite side of the one surface, and is arranged in the hole portion in a state where at least a part of the another surface contacts with an inner wall surface of the hole portion which is in parallel to the center axis; and
- a pushing device that is arranged in the hole for pushing the metal frame along the inner wall surface of the hole portion, and wherein the strain detection element is fixed to the one surface of the metal frame through the fixing portion, and detects the strain of the metal shaft through the metal frame.

2. The torque sensor according to claim 1,
wherein the hole portion has a recess, which is prepared by recessing a part of the inner wall surface, and in which the metal frame is inserted along the inner wall surface, wherein the recess has a pair of tapered surfaces, each of which is tapered to reduce a size of the recess toward a depth direction of the recess, wherein the metal frame has a pair of side surfaces which contact with the one surface and the another surface of the metal frame, and is tapered to reduce a size of the another surface toward the another surface from the one surface, and wherein the metal frame is inserted into the recess in a state where the pair of side surfaces contact with the pair of tapered surfaces, respectively.

3. The torque sensor according to claim 1,
wherein the pushing device includes a first block that has a pair of protrusions, and pushes the metal frame against the inner wall surface of the hole portion by contacting the pair of protrusions with the one surface of the metal frame, and wherein the strain detection element is accommodated in a space of the first block which is defined between the pair of protrusions.

4. The torque sensor according to claim 3,
wherein the first block has a first inclined surface disposed on an opposite side of the pair of protrusions in the first block, wherein the first inclined surface is inclined in a tapered shape in a state where an opening side of the hole portion is located on an inner wall surface side than a bottom side of the hole portion, and wherein the pushing device further includes:
- a second block that has a second inclined surface inclined in a tapered shape in a state where the opening side of the hole portion is located on the inner wall surface side than the bottom side of the hole portion, and a screw hole penetrating along a center axis of the metal shaft, and is arranged in the hole portion in a state where the second inclined surface contacts with the first inclined surface; and
- a bolt that is inserted into the screw hole of the second block, and pushes the first block toward a metal frame side by sliding the second inclined surface of the second block on the first inclined surface while the bolt is screwed toward a bottom of the hole portion.

5. The torque sensor according to claim 3,
wherein the first block has a screw hole defined on the opposite side of the pair of protrusions in the first block, and wherein the pushing device has a bolt that is arranged between the first block and another inner wall surface of the hole portion facing the inner wall surface, and pushes the first block toward a metal frame side while the bolt is screwed into the screw hole of the first block.

6. The torque sensor according to claim 1,
wherein the metal shaft is a crank shaft configuring a part of an engine of an automobile, and wherein the hole portion is arranged on an one end of the crank shaft which is located on a rear side of the automobile.

7. The torque sensor according to claim 1,
wherein the metal shaft includes: a flat surface disposed on an outer surface; a depression prepared by recessing a part of the flat surface and having a wall surface on which an internal thread is formed; and a recess portion prepared by recessing a part of a bottom surface of the depression, wherein the recess portion has a tapered surface formed in a tapered shape in a state where an area of the recess portion parallel to the bottom surface of the depression is reduced toward a depth direction of the recess portion, wherein the base portion includes:
- a metal frame having a plate shape with one surface, another surface opposite to the one surface, and a side surface that contacts with the one surface and the another surface, and has a tapered shape in a state where a size of the base portion is reduced from the one surface toward the another surface, the side surface being inserted into the recess portion in a state where the side surface contacts with the tapered surface of the recess portion; and
- a bolt that has a hollow cylindrical shape with a hollow portion, has an external thread on an outer wall surface of the bolt, and fixes the metal frame to the metal shaft by being screwed to the recess, and wherein the strain detection element is fixed to a portion of the one surface of the metal frame corresponding to the hollow portion through the fixing portion, and detects the strain of the metal shaft through the metal frame.

8. The torque sensor according to claim 7,
wherein the metal frame has a detent portion that is hooked by a catch portion arranged on the recess in a state where the metal frame is inserted in the recess, and prohibits a rotation of the metal frame around a center axis of the bolt.

9. The torque sensor according to claim 7,
wherein, an angle disposed between two straight lines in parallel to one surface and the other surface of the side surface, respectively, when a cross-section of the metal frame is taken along a direction perpendicular to the one surface is defined as a tapered angle, wherein the tapered angle is equal to or larger than 5 degrees and equal to or smaller than 55 degrees.

10. The torque sensor according to claim 7,
wherein the metal frame includes: a cylindrical portion that has a hollow cylindrical shape and includes one end fixed to the one surface of the metal frame; a cap that has an umbrella shaped, is arranged in a hollow portion of the cylindrical portion, and covers the strain detection element; an extraction portion that is disposed in the cap, and extracts a detection signal of the strain detection element to an outside of the strain detection element; and a potting material that is arranged in the hollow portion of the cylindrical portion, and covers the cap to fix the cap to the metal frame, and wherein the bolt is integrated with the metal frame in a state where the cylindrical portion of the metal frame is inserted into the hollow portion, and the other end opposite to the one end of the cylindrical portion is hooked by the bolt.

11. The torque sensor according to claim 7, wherein the bolt has a ring-shaped end surface that pushes a portion of the one surface of the metal frame corresponding to the tapered surface toward a metal shaft side.

12. The torque sensor according to claim 1, wherein the metal shaft includes: a flat surface arranged on an outer surface of the metal shaft; and a depression which is prepared by recessing a part of the flat surface, wherein an internal thread is arranged on a wall surface of the depression, wherein the base portion is a bolt having a head and a screw portion that is connected to the head, wherein an external thread is arranged on the screw portion, wherein the strain detection element is fixed to the head of the bolt through the fixing portion, and wherein the bolt is fastened to the depression by screwing the internal thread and the external thread.

13. The torque sensor according to claim 12, wherein the bolt has a first mark indicating an orientation of the strain detection element with respect to the metal shaft, wherein the metal shaft has a second mark indicating a position of the first mark, and wherein the bolt is fastened to the metal shaft in a state where the first mark matches the second mark of the metal shaft.

14. The torque sensor according to claim 13, wherein the first mark is provided in correspondence with a cut start position of the external thread of the screw portion.

15. The torque sensor according to claim 12, wherein a distance from a center axis of the metal shaft to the outer surface is defined as r in the metal shaft, wherein the bolt is fastened to the metal shaft in a state where a height from the center axis of the metal shaft to an installation surface, to which the strain detection element is fixed, is equal to or larger than 0.5r and equal to or smaller than 0.9r.

16. The torque sensor according to claim 12, wherein the screw portion has a tapered shape to reduce a diameter of the screw portion toward a leading end of the screw portion, and wherein the depression of the metal shaft has a tapered shape to reduce a diameter of the depression toward a bottom surface of the depression.

17. The torque sensor according to claim 12, wherein an embedded member is embedded in a gap between the external thread and the internal thread.

18. The torque sensor according to claim 12, wherein the bolt is fastened to the metal shaft through a washer.

19. A method for manufacturing a torque sensor that detects a strain of a metal shaft having a bar shape as a measurement object of strain using a strain detection element of a surface acoustic wave type through a metal frame, the method comprising:

forming a flat surface on an outer surface of the metal shaft;

preparing the metal frame having a plate shape with one surface, another surface opposite to the one surface, and a side surface that contacts with the one surface and the another surface;

fixing the strain detection element onto one surface of the metal frame through glass; and arranging the metal frame on the flat surface, and bonding and fixing the metal frame to the flat surface in a state where the another surface of the metal frame, to which the strain detection element is fixed, faces a flat surface side, wherein in the bonding and fixing of the metal frame, an entire periphery of an outer edge of the another surface of the metal frame is welded to the flat surface by a laser.

20. The method for manufacturing the torque sensor according to claim 19, wherein, in the forming of the flat surface of the metal shaft, the flat surface of the metal shaft has a plane size equal to the one surface and the another surface of the metal frame, and the flat surface has a depression which is prepared by recessing a part of the flat surface, and wherein, in the bonding and fixing of the metal frame, the metal frame is engaged into the depression, and the side surface is welded to the wall surface by a laser in a state where the side surface is integrated with the wall surface of the depression.

* * * * *